United States Patent
Glaser-Inbari et al.

(10) Patent No.: US 6,801,350 B2
(45) Date of Patent: Oct. 5, 2004

(54) METHODS AND APPARATUS FOR OPTICAL DISK DRIVES USING OPTICAL SCANNING

(75) Inventors: Isaia Glaser-Inbari, Givatayim (IL); Rann Glaser, Givatayim (IL)

(73) Assignee: MMRI Photonics, Ltd., Tel Aviv (IL)

( * ) Notice: Subject to any disclaimer, the term of this patent is extended or adjusted under 35 U.S.C. 154(b) by 0 days.

(21) Appl. No.: 09/984,369

(22) Filed: Oct. 30, 2001

(65) Prior Publication Data

US 2003/0086141 A1 May 8, 2003

(51) Int. Cl.[7] ............................................. G02B 26/08
(52) U.S. Cl. ...................................... 359/196; 359/205
(58) Field of Search .................................. 359/196, 201, 359/202, 204, 205, 210; 369/44.23

(56) References Cited

U.S. PATENT DOCUMENTS

| | | | |
|---|---|---|---|
| 4,550,249 A | 10/1985 | Damen et al. | |
| 5,337,298 A | 8/1994 | van Rosmalen | |
| 5,761,162 A | * 6/1998 | Gerber et al. | 369/44.23 |
| 5,872,663 A | * 2/1999 | Lee et al. | 359/833 |
| RE36,393 E | 11/1999 | Glaser-Inbari | |

FOREIGN PATENT DOCUMENTS

| | | |
|---|---|---|
| EP | 0 545 735 | 6/1993 |
| JP | 05-073944 | 3/1993 |

OTHER PUBLICATIONS

US RE36393, "Multi–Lens Actuator for Optical Storage", IBM Technical Disclosure Bulletin, vol. 39, No. 3, Mar. 1, 1996.

* cited by examiner

*Primary Examiner*—Euncha Cherry
(74) *Attorney, Agent, or Firm*—Browdy and Neimark, P.L.L.C.

(57) ABSTRACT

Apparatus for scanning a rotating optical disk, including: a scanning assembly for directing a light beam toward the disk surface and causing the beam to traverse the surface; a focusing lens unit disposed in the path of the beam to focus the beam at the surface; and a light beam deflecting element disposed in the beam path between the scanning assembly and the focusing lens unit to deflect the beam toward a direction perpendicular to the surface. The focusing lens unit may be composed of a group of individual focusing lenses spaced apart parallel to the surface, each having an optical axis that is perpendicular to the surface and each being associated with a respective track; and light directing elements disposed in line with the path at a location for directing light substantially entirely to a respective one of the individual lenses.

23 Claims, 19 Drawing Sheets

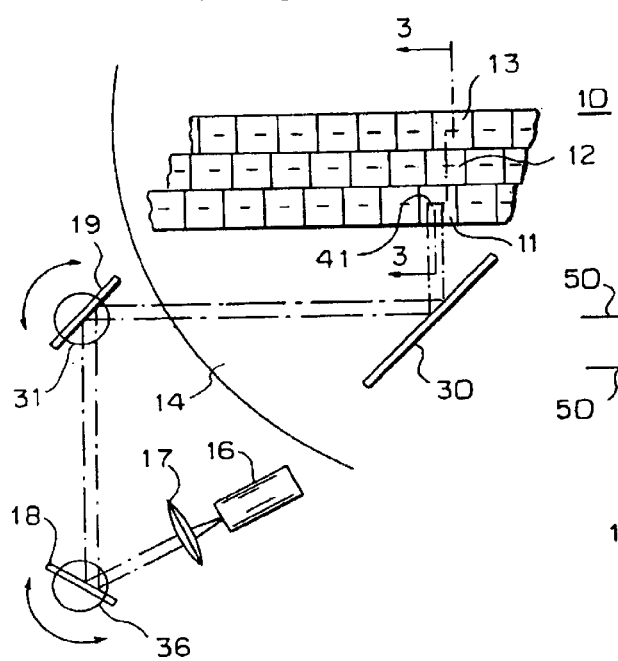
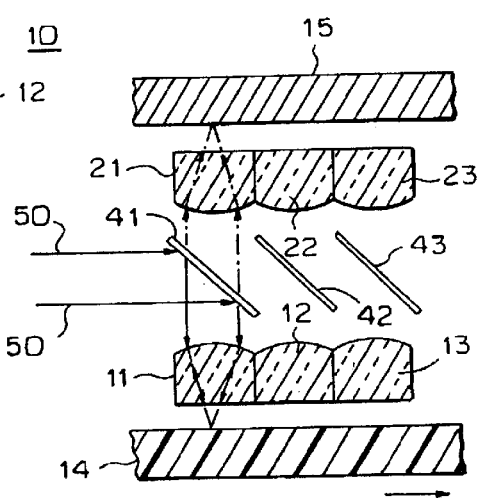

F I G. 4
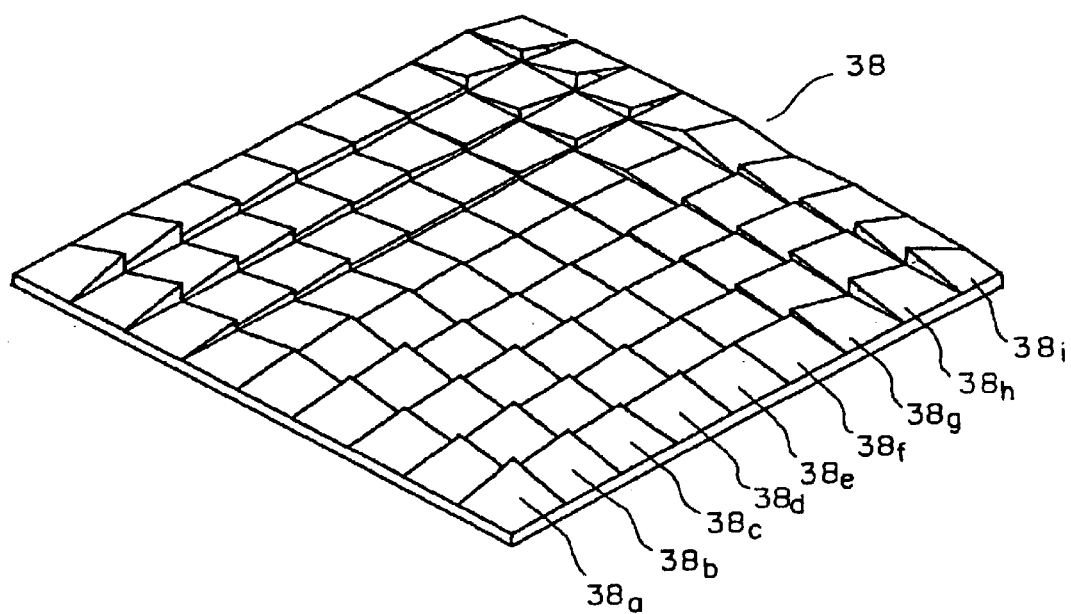

METHODS AND APPARATUS FOR OPTICAL DISK DRIVES USING OPTICAL SCANNING

BACKGROUND OF THE INVENTION

The present invention relates to improvements in optical disk drives and scanning methods.

Optical disk drives are devices that can read, and possibly also write data on, and erase data from, optical disks. The data may be analog or digital, and may contain computer data, video, audio, or other information. To be able to read data, an optical disk drive needs to focus laser light to a spot about 1 μm or less in diameter on a recording surface area of the disk, then collect the light reflected from that spot. It also needs to reach any point on the recording area of the disk quickly. To record on rewritable optical disk media, the drive must additionally be capable of delivering sufficiently high laser power into this spot, and must have means to modulate the intensity of the light.

The conventional optical disk drive has a head, typically containing one or more semiconductor lasers, lenses and other optical devices, optical detectors and electromechanical focus and tracking actuators. To reach a particular location on the disk, the head moves essentially along a radius of the disk, while the disk is rotating. Since the head is complex and contains many optical and mechanical parts, it is heavy, resulting in slow acceleration. Therefore, the time it needs to reach a particular destination, the seek time, is relatively long. This long seek time is even more disturbing when compared with that of hard disk drives in which ultra lightweight magnetic heads are employed. It is well known that the overall performance of a disk drive is strongly affected by the seek time.

Several attempts to overcome or circumvent these limitations of conventional optical disk drive technology have been described. Two of these, both using one or more laser beam scanners with an array of focusing elements, will be discussed below.

While many attempts to improve optical disk drives have been made and described in publications, they are primarily intended to improve the transfer rate of data between the optical disk media and the electronic signal processing channel, usually by applying parallelism. Transfer rate is the number of bytes per second that can be read or written after the correct physical disk location has been accessed. A well-known approach to increasing transfer rate without increasing the rotational speed of the disk is parallel access. However, the known implementations of this approach do not support decrease of seek time. In practice, since they all add complexity and weight to the moving head, they should actually increase the seek time. In addition, they are applicable only to readout and are not intended to support multiple track writing.

However, although increase in transfer rate would be desirable, it is presently believed that access time is far more significant—for most computer based applications the time spent getting to the correct location on the disk far exceeds the raw transfer time. Access time is the sum of seek time, which is the time it takes the head to reach a specific track, and latency, which is the time needed for the disk to rotate until the right part of the track (sector) is next to the head. Access time is the combination of seek time and latency—the total time from initiation of commands till actual read/write operation can start. It has been proposed to decrease the seek time in optical disk drives by decreasing the weight and size of the moving head, essentially, for example, by splitting the head into a stationary part and a lighter moving part or by adopting substrate-mode optics, or planar optics, in the internal construction of the moving head. Neither technique can approach the order of magnitude of the weight of heads already deployed in non-optical magnetic computer disk drives, or hard disk drives (HDDs).

The different characteristic of light, as opposed to electrons, makes miniaturization of the optical system of a moving-head optical disk drive to the order of magnitude of the size already employed in HDD heads inherently extremely difficult.

Glaser, U.S. Reissue Patent No. Re 36,393, entitled Two-dimensional random-access scanning for optical disks, reissued on Nov. 16, 1999, the disclosure of which is incorporated herein by reference, discloses an arrangement, as shown in FIG. 1 (taken from that patent), that uses two-dimensional (2D) scanning and a 2D array of light focusing devices, such as a 2D lenslet array. In FIG. 1, light that is generated by a laser 2 passes through beam shaping optics 5 and is then redirected by a two-dimensional optical scanner. The optical scanner is composed of two moving mirrors 7 and 8 and two electromechanical actuators, M1 and M2 toward a two dimensional array of focusing elements 1, depicted as a lenslet array. Each focusing element in the array addresses a range of tracks on the recorded, or recording surface area 3 of the disk. The specific track selected depends on the precise angle at which the laser light reaches that lenslet. For readout, light focused on the track is reflected back through the same lenslet, acting as a 'cat-eye' retro-reflector to send light back toward its source. This retro-reflected light is intercepted by a beam splitter 11 towards a stationary detector head 12. The detector head, with its associated electronics, derives signals for the data on the disk, as well as for servo controls such as tracking and focus.

Damen et al, U.S. Pat. No. 4,550,249, entitled Optical disk read/write apparatus, issued on Oct. 29, 1985, the disclosure of which is incorporated herein by reference, describes a different type of optical and mechanical configuration for an optical disk drive scanning system.

The basic embodiment of this configuration has two lenslet arrays (10, 11 and 12 in FIGS. 2A, 11, 12, 13, 21, 22, and 23 in FIG. 2B, FIGS. 2A and 2B being taken from the Damen at al patent), one above the other, with a set of semi-reflecting, or slotted, mirrors between them (41, 42 and 43 in FIG. 2B). A laser beam 50 from a laser 16 is directed by a series of mirrors 18, 19 and 30 towards the gap between the two arrays. This laser beam 50 is split by a first semi-reflecting mirror 41 and the reflected beam is directed through, and focused by, a lenslet 11 toward a disk data storage and/or recording surface 14. The beam is then reflected by the same disk surface, passes through lenslets 11 and 21 and semi-reflecting mirror 41 and is imaged onto a detector array 15. Laser beam light that passes through mirror 41 is then split by semi-reflecting mirror 42, where it is focused on another location on the disk recording surface 14 and imaged onto the detector array 15, and so on. Sufficient optical power must be provided to allow this multiple parallel access. The beam steering system of moving mirrors 18 and 19 is one-dimensional in the sense that it can move the laser beam only in a single plane.

A drawback of this prior art system is that writing is essentially impractical. Since all of the illuminated tracks get the same signal, they would all be written by the same data, resulting in multiple copies and a vastly smaller effective data capacity. Laser power is distributed over many tracks, so a very powerful laser is needed to obtain sufficient writing energy. Wrong tracks will be accessed. The same patent describes an alternative configuration with slit mirrors instead of beam splitter, but a simple calculation shows that these slit mirrors will cause the focused spot to become larger, intolerably decreasing the data capacity of the disk. While that system allows parallel access, the tracks that are accessed together are not adjacent ones. As a result, tracks are read in the wrong order, at least for removable disks that are formatted for conventional drives.

This scheme seems to provide both fast access and parallel (high data rate) readout. However, since the accessed tracks are far from each other, focusing errors, due to surface irregularities etc., will probably be uncorrelated, so that central focus correction is unlikely to work.

BRIEF SUMMARY OF THE INVENTION

It is an object of the present invention to provide substantial improvements to optical disk drives and scanning methods, enhancing their capabilities while lowering the cost of manufacturing such optical disk drives.

This invention achieves such improvements, in part, by moving light beams instead of optical heads.

Objects according to the invention are achieved by the provision of apparatus for scanning an optical disk that is mounted for rotation with a data surface of the disk disposed in a scanning plane, the disk data surface having light reflecting areas, the apparatus comprising:

a light source for producing a relatively narrow beam of light;

a scanning assembly for directing the beam toward the scanning plane and causing the beam to traverse the scanning plane;

a focusing lens unit disposed in the path of the beam to focus the beam at the scanning plane; and a light beam deflecting element disposed in the beam path between the scanning assembly and the focusing lens unit to deflect the beam toward a direction perpendicular or near perpendicular to the scanning plane.

When reference is made herein to a data surface, or a disk surface carrying data, it is to be understood that the data surface in optical disks is sometimes an internal surface where the disk is made of two cemented thinner pieces, as in a DVD, or a surface at the side opposite to the laser source, as in a CD.

Objects according to the invention are further achieved by apparatus for scanning an optical disk that is mounted for rotation with a surface of the disk disposed in a scanning plane, the disk disposed in a scanning plane, the disk surface having a light reflecting areas arranged in a plurality of mutually parallel, or near parallel, tracks, the apparatus comprising;

a light source for providing a relatively narrow beam of light and directing the beam along a selected path;

a focusing unit comprising a group of individual light focusing elements, possibly, lenses spaced apart parallel to the scanning plane each having an optical axis that is essentially perpendicular to the scanning plane and each being associated with a respective track; and light directing means disposed in line with the path at a location for directing light from the light source substantially entirely to a respective one of the individual lenses.

To aid understanding of the present disclosure, specific examples of key components are often used instead of the more general terms. It is to be understood that this terminology should not be interpreted as to exclude the use of substitute or equivalent devices and/or sub-systems. In all cases, any device or sub-system mentioned in the text, and/or shown in the drawing specifically refers to any and all possible substitute or equivalent devices and/or sub-systems, which are all covered by the invention, its embodiments, and examples. As specific cases, without excluding others, note the following terms:

Lenses—are generalized to any optical imaging, light-focusing, and/or light diverging devices, including, but not limited to,
  simple refractive lenses of all suitable kinds, possibly with an aspherical surface or surfaces,
  reflective optical elements that can perform the required function
  systems comprising one or more reflective, and one or more refractive, optical elements, or an element or elements that both refract and reflect light,
  diffractive optical elements,
  holographic optical elements,
  elements combining refractive, and/or reflective, and/or diffractive, and/or holographic, surfaces,
and/or
  compound optical systems (comprising several simple lenses and/or other optical elements including all or any of those described above, with suitable mechanical mount, if needed), Lenslet arrays—may be substituted by arrays of small "lenses" (=lenslets) as defined just above. It is noted that not all "lenses" in a single array must be identical, and that the centers of the "lenses" may not necessarily, in fact are likely not to be, arranged in a Cartesian or other periodic array. The term "lenslet" is thus used here to refer to a small lens in the generalized sense defined above, typically of aperture not larger than 10 millimeters.

Scanners—are any devices that are used to change the direction of a light beam, as directed by signals that are generated by an electronic system. In addition to the mechanical actuator/moving mirror assemblies depicted in the drawings herein, some other possible types are:
  MEMS (Mechanical Electronic Micro Systems) or MEOMS (Mechanical Electro-Optical Micro Systems) scanners, including those disclosed in: M. Edward Motamedi, Angus P. Andrews, William J. Gunning and Moshen Khosh-nevisan, "Miniaturized micro-optical scanners," Optical Engineering 33(11), 3616–3623 (1994); "Beam deflectors will be smaller and faster," Opto & Laser Europe (issue 68), 20{21}(November 1999); and "Sandia micromirrors may be part of Next Generation Space Telescope," Internet URL www.sandia.gov/media/NewsRel/NR1999/space.htm (November 1999).
  Electro-optical beam steering devices
  Acoustic-optical scanners
  other types of opto-mechanical scanning devices, such as, for example, scanners based on
    moving or rotating prisms,
    systems containing lenses that move essentially perpendicularly to their optical axis
    moving diffraction gratings, etc.

Prisms—may be substituted by suitable gratings, possibly holographic or diffractive.

It is also noted that optical systems can be "folded" to decrease their volume and/or footprint. Such folded variants of the systems covered by this invention are also explicitly included.

The terms 'lens', 'lenslet', 'lenses' and 'lenslets' are used throughout the following description, and drawings of lenses and lenslets appear in the figures as examples of general light focusing element or elements. Whenever these terms are used, they are intended to mean any optical device for focusing light, including, but not limited to, refractive lenses and lenslets, diffractive optical elements, Fresnel lenses and lenses and suitable holographic optics. Reference is made to Selected Papers on Holographic and Diffractive Lenses and Mirrors, T. W. Stone and B. J. Thompson, editors, (SPIE Optical Engineering Press, Bellingham Wash., 1991) and the bibliographies therein.

Conventional optical disk drives contain heads that move in order to access a specific track on the disk. These moving heads typically contain a laser (or sometimes, several lasers), at least one lens, other optical elements, detectors, and actuators that enable focus and track following. Some split head designs keep some of these elements further away from the moving head, in order to reduce moving mass and thus allow shorter seek times, seek time being the time needed to get to a specific track. Embodiments of the invention achieve, or approach, the following results:

move everything except the last focusing lens away from the disk surface; and in some embodiments, replace a single moving lens by an array of stationary lenses, or other light focusing elements, so that there would be no need to have any moving head next to the disk surface;

The invention can also serve to increase the transfer rate of data and to decrease the latency, which is the time needed to wait until, through the rotation of the disk, the proper sector of the track gets next to the lens.

The invention offers one or more of the following improvements over systems of the type disclosed in the above-cited Glaser patent: accurate beam positioning can be achieved with relatively inexpensive lenses; less expensive, and potentially more compact, scanners can be used to obtain improved performance; the transfer rate of data, represented by the number of bytes per second read or written once the correct track and sector on the disk have been accessed, can be increased; and the latency, which is the wait time needed while the disk rotates to the correct position to start reading or writing, can be reduced without increasing the rotation speed of the disk.

BRIEF DESCRIPTION OF THE DRAWING

FIGS. 2A and 2B are a plan view and a cross-sectional detail view of a second type of prior art scanning arrangement.

FIG. 4 is a perspective view of a component of the embodiment of FIG. 3.

DETAILED DESCRIPTION OF THE INVENTION

To facilitate understanding of the drawings, the optical disk is shown in most of them as located at the bottom of the optical system. It is explicitly stated here that there is no intrinsic reason preventing the same optical system from being inverted, or placed in any other position or orientation, as may be dictated by engineering, packaging, or any other considerations. All figures are schematic and not to scale except where explicitly stated otherwise.

Figure 3:
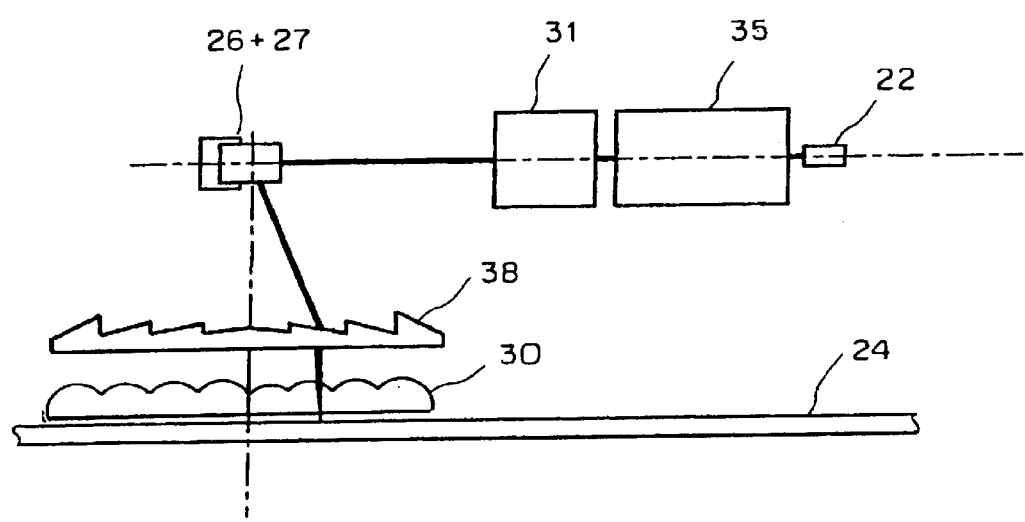
FIG. 3 is a side elevational view, partly in cross section, showing a first embodiment of the invention.

The basic components of a first embodiment of the invention are shown in FIGS. 3 and 4 and utilizes a refracting element composed of a plurality of prisms, which, as noted elsewhere here, can be replaced, for example, by an equivalent set of diffractive gratings or holograms. A light beam coming from a laser 22 passes through a beam shaping optical unit 35 and a beam splitter 31. The light beam is then deflected by scanning mirror assemblies 26 and 27 toward a lenslet array 30 that focuses the beam on the recording surface of an optical disk 24 essentially as disclosed in the Glaser patent. However, before reaching lenslet array 30, the light beam is intercepted by an array of small prisms, or a prism array, 38.

Each mini-prism (hereinafter prism) in array 38 is located precisely over one lenslet of lenslet array 30 and has a planar top surface orientation dependent the location of the optical center of that lenslet in the lenslet array, as shown most clearly in FIG. 4. It is noted that though FIG. 4 depicts the prism array as Cartesian, in practice other arrangements may, and in fact are likely to, be utilized, to fit the arrangement of the lenses in the lenslet array as discussed in the Glaser patent. All prisms may have a common planar bottom surface, or different bottom surfaces. In either case, the inclination of the top surface of each prism, and of the bottom surface (or surfaces if all prisms do not have a common bottom surface), are selected such that a light beam that comes from the center of the scanning mirror assembly 27 and is intercepted at the center of a prism, will be deflected along a path normal to the surface of disk 24 in FIG. 3, and parallel to the optical axis of the lenslet just below it. It is here assumed that the distance between the two scanning mirrors, 26 and 27 in FIG. 3 (and mirrors 7 and 8 in FIG. 1) is negligible, or very small, compared with their distance from the prism array, so that the beam can be considered to come from a point whose distance from the prism array is the average optical distance from scanning mirrors 26 and 27. Also, mirrors 26 and 27 can be replaced by a single mirror with two-axis movement (a gimbaled mirror) or some other two-dimensional beam steering device. This beam will be focused by that lenslet at or near the intersection of the optical axis of the specific lenslet with the recording surface of disk 24. Small deviations of the center of the beam from the center of a lenslet will cause the focused spot to be slightly off the axis—this is intentional, allowing access to multiple tracks through each lenslet, so the number of required lenslets is much smaller than the number of tracks. This is described in the earlier Glaser patent, cited above, and in the following paragraph. For the purposes of this invention, it is sufficient that both the top and bottom of each prism are planar. However, it is possible also to use a curved, concave or convex, surface or surfaces, to add additional optical functions to the prism array. It is noted that the prism array 38 does not act as a Fresnel lens. Unlike a Fresnel lens, the gradient, or slope, at both sides of a break between two adjacent prisms does not necessarily match.

If a beam that comes from the center of the downstream scanning mirror is intercepted by a prism of array 38 at a point slightly offset from its center, the beam coming out of the prism toward the lenslet below will also slightly deviate from the direction of the optical axis of the lenslet. When this slightly off-axis beam is focused by the lenslet onto the disk-recording surface, it will not focus precisely on the intersection of the optical axis of the lenslet with the disk-recording surface, but slightly to the side. Thus, by small changes in the direction of the beam that reaches a prism, access can be gained to a group of several tracks of data on the disk.

Figure 5:
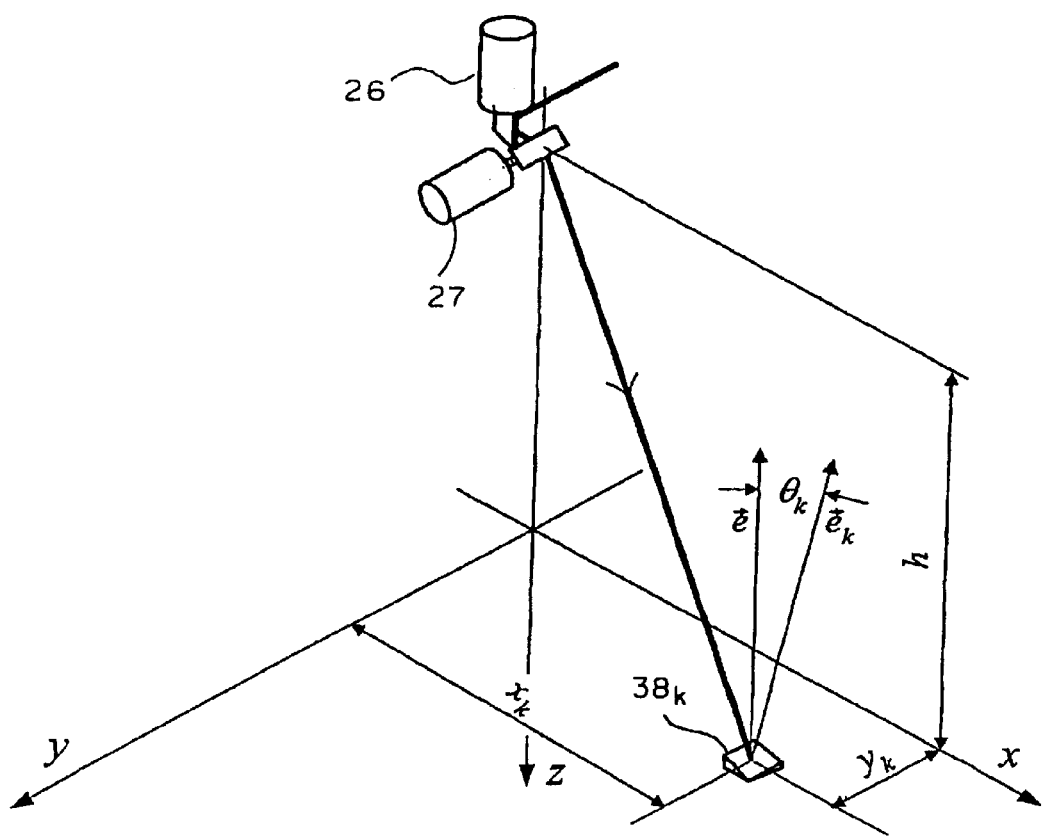
FIG. 5 is a pictorial view illustrating the geometry of an individual prism.

FIG. 4 gives an overall view of a mini-prism array. Although the array is depicted in FIG. 4 as Cartesian, in practice it need not be Cartesian. The locations of the individual prisms follow that of the lenslets in lenslet array 30, which, as already discussed in the cited Glaser patent, need not be either Cartesian or strictly periodic. FIG. 5 shows that array 38 may contain a large number of individual prisms, $38_a$, $38_b$, $38_c$, $38_d$, $38_e$, $38_f$, $38_g$, $38_h$, $38_i$, etc. The top surface of each prism has an orientation that is individually determined, as mentioned above. The size of each individual prism is equal to, or larger than, an individual lenslet in the lenslet array, typically somewhere in the range of 0.1 mm to 10 mm on a side, depending on the type of disk to be accessed and other considerations. Like the lenslet array, the prism array may have a low fill-factor, with relatively large unused spaces between the prisms.

FIG. 5 shows how the inclination angle for each individual prism may be calculated. For example, prism $38_k$ is centered at coordinates $x=x_k$, $y=y_k$ and $z=0$. A beam comes from the center of the scanner mirror 27 (at coordinates $x=0$, $y=0$, $z=-h$), and intercepts prism $38_k$ at its center. Vector $\underline{e}$ is normal to the surface of the disk, parallel to the optical axis of the lenslet, and parallel to the direction of the z-axis; vector $\underline{e}_k$ is perpendicular to the top surface of prism $38_k$. Since the center of the scanner mirror is located on the z-axis at height h above the prism array, the angle $\alpha_k$ of incidence of the beam relative to vector $\underline{e}$ is given by $$\alpha_k = \tan^{-1}\frac{\sqrt{x_k^2 + y_k^2}}{h} \qquad (1)$$

The beam, the z-axis, $\underline{e}$ and $\underline{e}_k$ all share the same plane.

The slope of this individual prism $38_k$ is dictated by its location, the refractive index $n_{prism}$ of the prism material, and by the overall design. For the case where the bottom of array 38 is flat, applying Snell's law of refraction gives:

$n_{prism}\sin\theta_k = n_{air}\sin(\theta_k + \alpha_k)$ and since $n_{air} = 1$, then $$\theta_k = \tan^{-1}\left(\frac{\sin\alpha_k}{n_{prism} - \cos\alpha_k}\right) \qquad (2)$$

In FIG. 5, the main optical axis, the axis of the beam that comes from the center of the scanner to the center of the prism, the normal to the disk surface, vector $\underline{e}$, and the normal to the prism surface, $\underline{e}_k$, are all in a single plane, so $\theta_k$ entirely defines the slope of the prism surface.

Since, in a dual scanner system, the effective distance between one scanner and the prism array cannot be the same as from the other scanner to the prism array, Eq. (2) serves, for such systems, as an approximation. In practice, this approximation is often adequate. For those cases where better precision is needed, the precise formula can be developed following the basic laws of geometrical optics.

Figure 6:
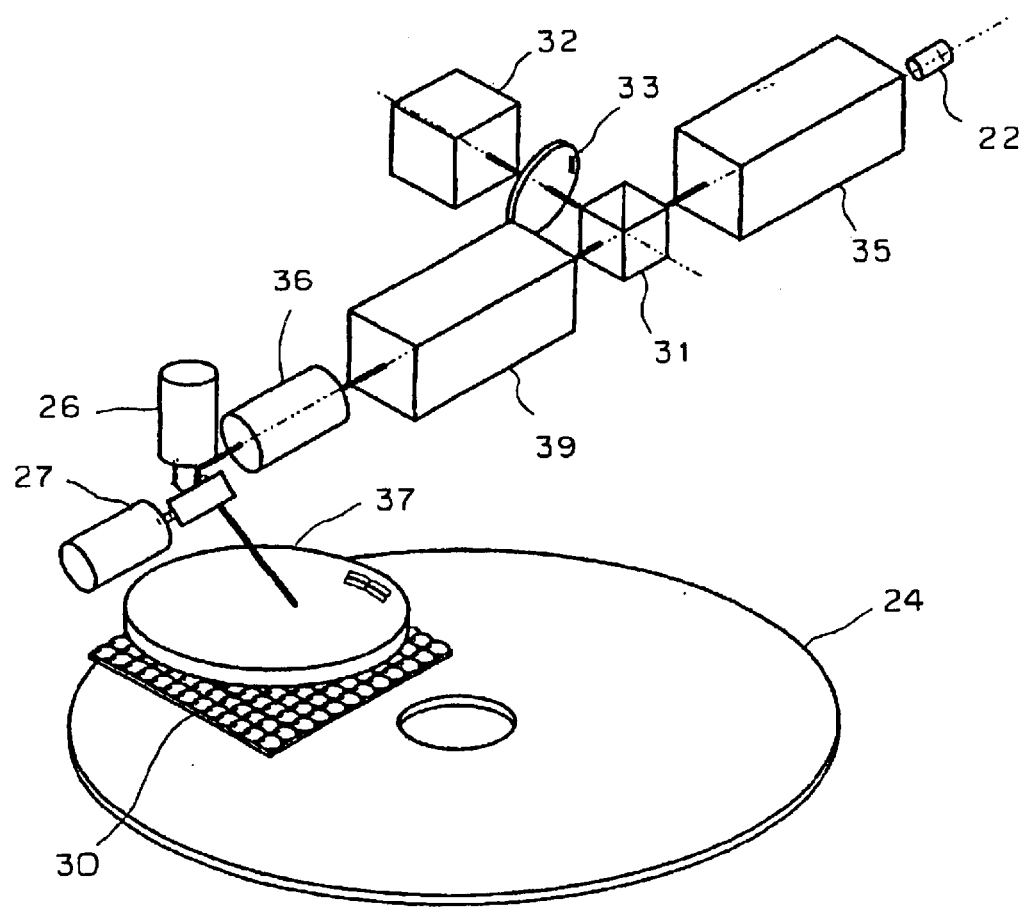
FIG. 6 is a perspective view of a second embodiment of the invention.
Figure 17:
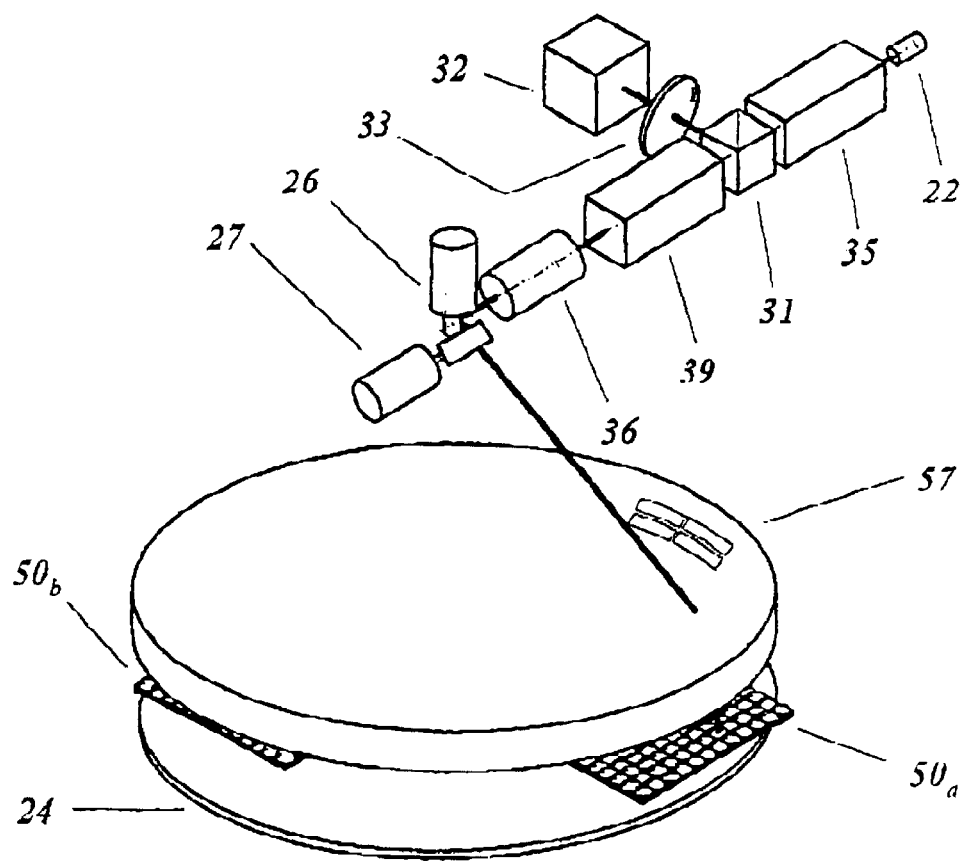
FIG. 17 is a perspective view of a fifth embodiment of the invention.
Figure 18:
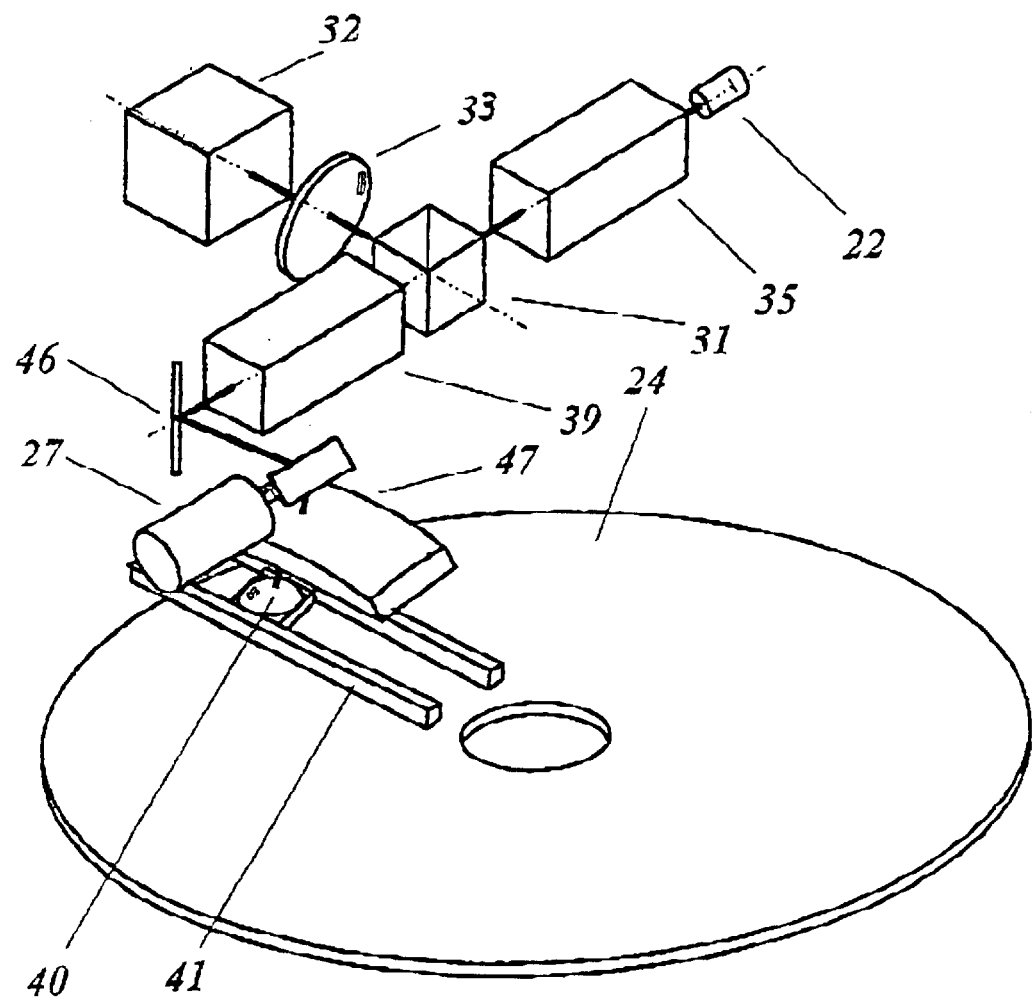
FIG. 18 is a perspective view of a sixth embodiment of the invention.

FIGS. 6–10 show basic building blocks for the embodiments of FIGS. 7 through 15 and 17, and in part, also FIG. 18. FIG. 6 schematically depicts a system for accessing, i.e., for reading and/or writing data on optical disks. In this system, a beam of light emerges from a source, typically a laser, 22, through a beam shaping optical subsystem 35, and a beam splitter 31. The light continues directly through that beam splitter, then through another optical system 39, to be described in detail below, and an optional image rotation device 36. The light is redirected by a two-dimensional scanning device (shown here as a pair of galvanometer driven movable mirror assemblies, 26 and 27) toward a relatively large lens 37 that performs the functions similar to those performed by mini-prism array 38. The focal length of lens 37, $F_{37}$, is equal to, or is close to, the distance between itself and scanners 26 and 27. The beam that emerges from the other side of lens 37 is intercepted by one of the lenslets in lenslet array 30, which focuses it onto the data surface, or recording surface, of rotating optical disk 24.

For readout, the reflected light from the disk goes again through the same or another lenslet, acting now as a 'cat-eye' retro-reflector. Since the mini-prism of FIGS. 3–5 is stepped and has planar surfaces, whereas lens 37 of FIG. 6 is smooth and curved, a small deviation in the angle of the incoming beam in FIGS. 3–5 results in a small change in the location of the focused spot. In contrast, as long as the beam is moved only by moving scanners 26/27, the direction of the beam that comes out of lens 37 is constant. Thus, in FIGS. 3–5 (as in the previously cited Glaser patent) the main scanners select both the lenslet and the spot position below the selected lenslet; here scanners 26+27 select only the lenslet. The selection of the location of the spot for the selected lenslet is done by other means, as will be explained later on with reference to FIGS. 8,9,11,12 and 13. This decoupling greatly relaxes the need for precision scanners, a main benefit of this invention. The beam retraces precisely the same optical path that brought it to the disk, until it is intercepted by the beam splitter 31. Reflected light from the beam splitter goes toward a detector assembly sub-unit 32, possibly through an optional collecting lens 33.

The beam splitter 31 may be a polarizing beam splitter, which may be combined with a quarter-wave retarding plate. In that case the light from the laser is linearly polarized, with polarization set to pass nearly completely through the beam splitter, then is converted to circularly polarized light by the quarter wave plate. As the circularly polarized light is reflected from the disk data surface, the hand-ness of the circular polarization changes. When this light re-enters the quarter wave plate, it is converted back to linearly polarized light, this time of the direction that is practically totally reflected by the beam splitter. This scheme greatly improves light efficiency since on the way out practically no light is reflected away from the system, and on the way back practically all the light is directed towards the detectors.

A novel feature of the embodiment shown in FIGS. 6–9 and 11–17 is the use of a large lens 37 in the new configuration presented here. Together with suitable components in the optical sub-unit 39, it enables several new capabilities.

Figure 7:
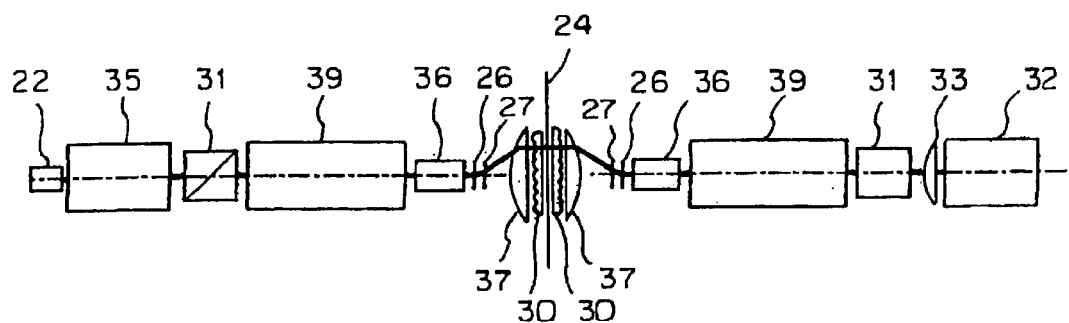
FIG. 7 is a spread optical diagram of the system of FIG. 6.

The operation of the system of FIG. 6 will be explained with the aid of the spread optical diagram of FIG. 7, which utilizes the same numbering as FIG. 6. Following common practice among optical designers, the diagram of FIG. 7 removes all folds generated by reflection in the main optical axis, showing the system as if it were located along a single axis. Since light travels through some optical devices and sub-units twice, these are drawn in the spread diagram twice. Thus, a light beam from source 22 at left goes through beam shaping sub-unit 35, beam splitter 31, optical sub-unit 39, and optional image rotator 36. Light is now deflected by scanners 26 and 27 toward lens 37. While the light beam does not necessarily travel parallel to the optical axis of the system in the section between scanners 26 and 27 and lens 37, it emerges from lens 37 parallel, or nearly parallel, to that axis. Thus, it is parallel, or nearly parallel, to the optical axis of the individual lenslet it intercepts. This lenslet, from array 30, focuses the light on the data surface of disk 24. From this point on the reflected light, shown traveling left to the right from disk 24, goes again through the same lenslet of array 30, lens 37, and the optical sub-unit, but now the part of the beam that is reflected through the beam splitter 31 toward the detector assembly 32, possibly via the optional collecting lens 33 is traced.

The function of the optical relay sub-unit 39 will be described with reference to FIGS. 8A and 8B, which show the same system. In FIG. 8, light travels from left to right and a spread view of the optical path, the same in principle as for FIG. 7, is used. Optical elements in the system are indicated only by planes representing their median positions or principal planes. Plane $P_p$ is the location of the optical entrance pupil of sub-unit 39, plane $P_{26+27}$ indicates the position of scanners 26 and 27 of FIG. 6, plane $P_{37}$ is the principal plane of large lens 37 in FIG. 6, and plane $P_{30}$ is the common plane of the entrance pupils of all lenslets in lenslet array 30 of FIG. 6. FIG. 8B does not purport to show the form of a beam that will be transmitted to plane $P_{30}$ during normal system operation. Rather, its purpose is to illustrate an important optical property of sub-unit 39 together with lens 37, which is that a point on plane $P_p$ will be imaged on plane $P_{30}$.

Figure 8A:
FIGS. 8A and 8B are ray diagrams illustrating the operation of unit 39 shown in FIGS. 6 and 7.
Figure 8B:
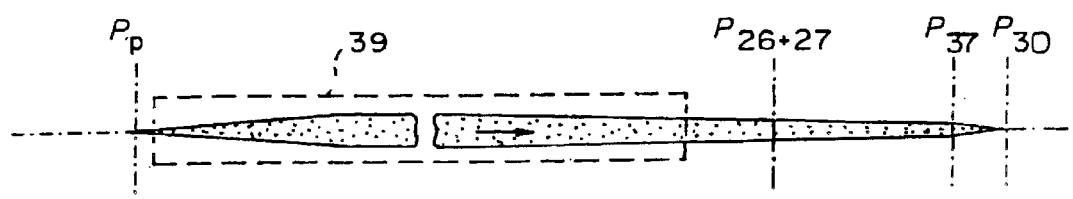

Only the part of the light path between the entrance pupil plane of sub-unit 39 and the lenslet array is shown in FIGS. 8A and B, which illustrate two optical requirements for the sub-unit. FIGS. 8A and 8B show that sub-unit 39 of FIGS. 6 and 7 satisfies simultaneously two conditions: (a) together with lens 37 it forms an afocal optical system that transform a collimated beam from plane $P_p$ to a collimated beam at plane $P_{30}$; (b) again, with lens 37, it will image a point on plane $P_p$ onto a point on plane $P_{30}$. In optical terminology, the combined system 39 with lens 37 form an afocal system with entrance pupil at plane $P_p$ and exit pupil at plane $P_{30}$; any collimated beam entering the system at the plane $P_p$ will leave it as collimated at plane $P_{30}$. Furthermore, for a given position of scanners 26+27, the location of the interception of the beam with plane $P_{30}$ will be independent of the direction of that beam as it entered the system at $P_p$. In FIG. 8A, if a collimated beam is directed into optical sub-unit 39 at plane $P_p$ it will exit as a collimated beam at plane $P_{30}$. FIG. 8B shows that a point source at plane $P_p$ is imaged into a point at plane $P_{30}$. The large lens 37 in FIG. 6 has a focal length $F_{37}$ that equals the distance between that lens and scanners 26 and 27. Sub-unit 39, together with large lens 37, act as an afocal optical telescope with entrance and exit planes at $P_p$ and $P_{30}$, respectively. If the diameter of the entrance pupil of this system multiplied by the lateral magnification of the combined system is not larger than the diameter of a lenslet, then 1.) Essentially all of the light that comes from the entrance pupil will arrive inside the entrance pupil of a specific lenslet, determined by the positions of scanners 26 and 27;
2. Essentially all light that was collimated as it entered sub-unit 39 arrives collimated at the lenslet array; and
3. Any beam that enters sub-unit 39 parallel to its optical axis will arrive at the lenslet array perpendicular to the lenslet array plane $P_{30}$, regardless of the position of the scanners 26 and 27.

However, the actual location of the focus of sub-unit 39 may vary, causing the beam exiting from lens 37 to be non-collimated and resulting in a change in the precise focus point of the selected lenslet in array 30. Also, the beam entering sub-unit 39 at plane $P_p$ may be somewhat uncollimated (converging or diverging) again resulting in a change in the precise focus point of the selected lenslet in array 30. This can serve to accommodate for irregularities in the surface of the disk, as will be described below with reference to FIG. 13. Also, in configurations where two mirrors such as 26+27 are used rather than a single gimbaled mirror, both mirrors cannot, of course, be at the same focal point, so that a minor deviation must be accepted or can be compensated for. However, when the scanner is composed of two mirrors, these mirrors are sufficiently close together that, in most cases, the effect of their separation on the operation of the system can be either ignored, or be compensated for.

Figure 9A:
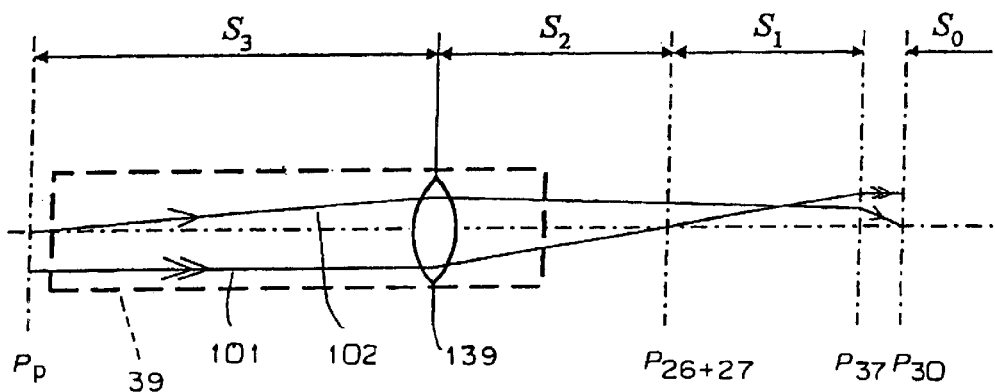
FIG. 9A is an optical diagram showing a simplified exemplary embodiment of the sub-system depicted in FIGS. 8A and 8B in more detail.

A simplified example of a suitable optical sub-unit 39 is shown in FIG. 9A. Sub-unit 39 may be constructed in a variety of ways; in this example, sub-unit 39 is comprised of a single component—a positive optical lens 139 having an effective focal length $F_{39}$. Thus, lens 139 is located at distance $S_2$ from the scanner plane $P_{26+27}$, and distance $S_3$ from the pupil plane $P_p$. The distance between the scanner plane $P_{26+27}$ and the collimating lens plane $P_{37}$ is denoted by $S_1$; this distance is equal to the focal length of the collimating lens, $F_{37}$. The distance between the principal plane $P_{37}$ of the large lens 37 (FIGS. 6 and 7) and the entrance pupil plane of the lenslet array (30 in FIGS. 6 and 7), $P_{30}$, is $S_0$.

To satisfy the conditions presented in FIG. 8A, a light ray 101 that enters the optical system as an off-axis ray that is parallel to the optical axis will intersect the optical axis at plane $P_{26+27}$. In that case, it will become again parallel to the optical axis after exiting the collimating lens at plane $P_{37}$. To satisfy the conditions presented in FIG. 8B, a light ray 102 that enters the optical system at its axis at plane $P_p$ will intersect the optical axis again at the lenslet array plane $P_{30}$. It should be understood, however, that this optical axis is actually deflected, or bent, by scanners 26 and 27. Thus, $S_3$, $F_{39}$ and $S_2$ must satisfy the following equations:

$$F_{39} = S_2 \quad (3)$$

and $$\frac{1}{F_{39}} = \frac{1}{S_1 + S_2 + S'_0} + \frac{1}{S_3} \quad (4)$$

where $S'_0$ is the apparent location of plane $P_{30}$, as imaged through lens 37, thus satisfying the relation $$\frac{1}{F_{37}} = \frac{1}{S_0} - \frac{1}{S'_0},$$

where $F_{37}$ is the focal length of the collimating lens 37.

A third condition is that the absolute value of the magnification of the system between planes $P_p$ and $P_{30}$ will be nearly equal to the ratio of the diameter of an individual lenslet in the array, $D_{lenslet}$, and the diameter of the entrance pupil at plane $P_p$. $D_p$. Simple geometry gives:

$$\frac{S_2}{S_1} = \frac{F_{39}}{F_{37}} \approx \frac{D_P}{D_{lenslet}} \quad (5)$$

Figure 9B:
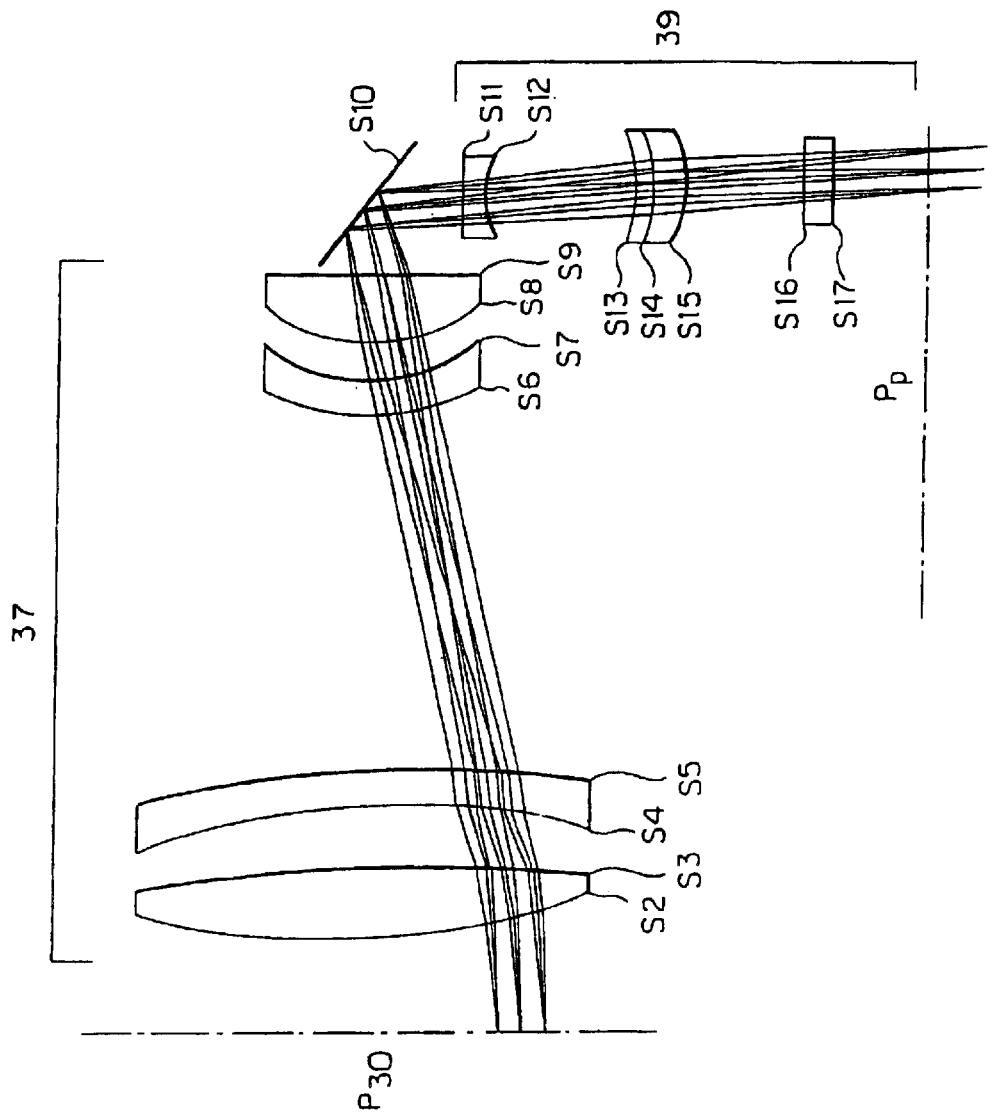
FIG. 9B is a diagram showing in detail one exemplary complex lens system that may be employed in embodiments of the present invention.
Figure 10:
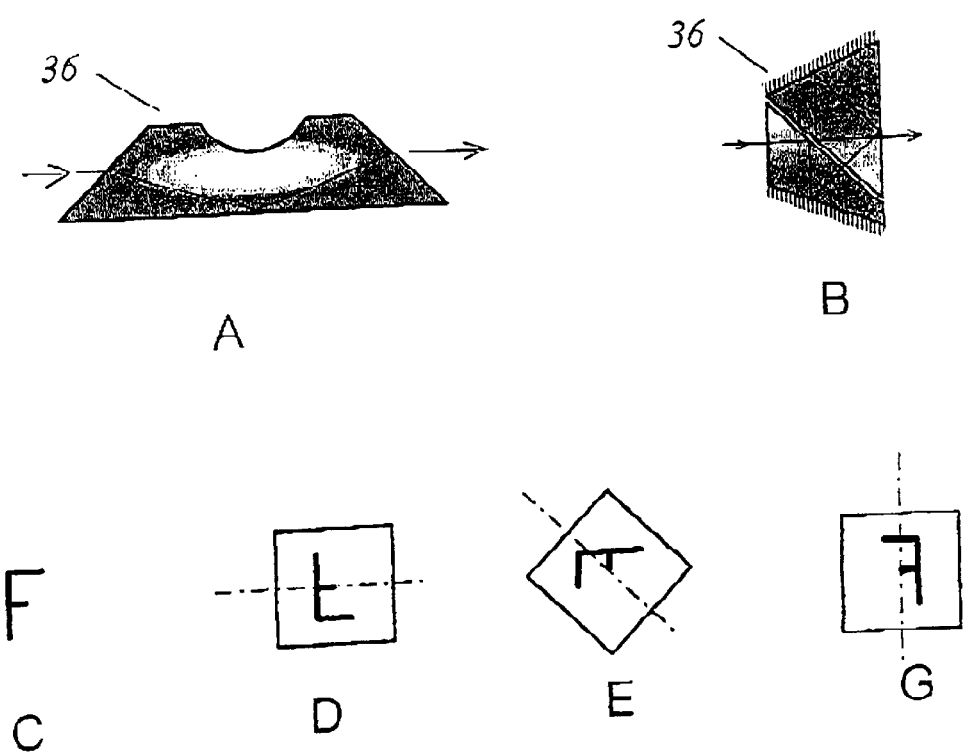
FIGS. 10A and 10B are cross-sectional views of prior art image rotator prisms and FIGS. 10C, 10D, 10E and 10F show various image orientations. These are examples of image rotation prisms that can optionally be used with some of the embodiments described here.

In the figures described thus far, lens 37 is a single optical element and unit 39 may be constituted by a single optical element 139. However, each of these lenses may be replaced by a complex lens having several optical elements to provide improved performance one exemplary complex lens system constituting lens 37 and the optical components of unit 39 is shown in FIG. 9B. An exemplary set of parameters for this lens system is shown in the Table provided below. This table lists the optical surfaces of both the complex version of large lens 37 and unit 39 in a format commonly used by lens designers and optical engineers. Yhis design was calculated for wavelength of 650 nm, commonly used in many optical disk drives. The Table starts at the surface representing the pupil plane of the lenslet array 30 ($P_{30}$). For each surface, the radius of curvature (positive is convex towards plane $P_{30}$) and the diameter is given. In the rows of the Table between the rows relating to the various surfaces, the thickness, or the distance between the surfaces, along the optical axis and the type of optical glass, using the Schott optical glass notation (Schott Optical Glass Catalog, Schott Glaswerke Optisches Glas, Mainz Germany, 1992), are given. Where the TYPE is listed as "AIR", the THICKNESS value is the distance along the optical axis between two successive glass elements. SURFACE RADIUS is the radius of curvature of the surface, which is positive for surfaces that are convex when viewed from the direction of $P_{30}$ and negative otherwise. APERTURE DIAMEER is the diameter of the clear (useable) aperture at the syrface. Thus, surfaces S2 and S3 are the surfaces of the glass element closest to plane $P_{30}$ (which is double convex, since the first radius is positive and the second negative, 8 mm thick along the axis, has diameter of 50 mm and made of SFL6 type Schott glass). Surfaces S2 through S9 are surfaces of four optical elements functioning together as lens 37, surface S10 represents the surface, or median surface, of scanners 26+27, or rather an equivalent two-axis scanner, and surfaces S11 through S17 are surfaces of four optical elements constituting unit 39. The elements associated with surfaces S13, S14 and S15 are cemented together so that there is no air space therebetween. The last line in the Table is the surface of plane $P_p$.

| SURFACE | SURFACE RADIUS | THICKNESS | APERTURE DIAMETER | GLASS/ MEDIUM TYPE |
|---|---|---|---|---|
| PUPIL PLANE $P_{30}$ | | | 5.4 | |
| | | 11.000 | | AIR |
| S2 | 76.780 | | 50.0 | |
| | | 8.000 | | SFL6 |
| S3 | −236.340 | | 50.0 | |
| | | 8.230 | | AIR |
| S4 | −74.700 | | 50.0 | |
| | | 4.000 | | SF14 |
| S5 | −116.020 | | 50.0 | |
| | | 42.730 | | AIR |
| S6 | 22.770 | | 24.0 | |
| | | 4.000 | | SFL6 |
| S7 | 16.355 | | 24.0 | |
| | | 5.340 | | AIR |
| S8 | 18.910 | | 24.0 | |
| | | 8.000 | | SFL6 |
| S9 | −2,690.000 | | 24.0 | |
| | | 9.620 | | AIR |
| S10 | FLAT SCANNER MIRROR(S) | | | RE-FLECTION |
| | | 10.000 | | AIR |
| S11 | 24.590 | | 10.0 | |
| | | 2.000 | | BK7 |
| S12 | 8.400 | | 10.0 | |
| | | 16.730 | | AIR |
| S13 | −45.650 | | 14.0 | |
| | | 2.000 | | SFL6 |
| S14 | −25.000 | | 14.0 | |
| | | 4.000 | | BK7 |
| S15 | −15.190 | | 14.0 | |
| | | 13.300 | | AIR |
| S16 | PLANE | | 10.0 | |
| | | 3.000 | | BK7 |
| S17 | −104.000 | | 10.0 | |
| | | 14.000 | | AIR |
| PUPIL PLANE $P_p$ | | | 5.4 | |

1) All surfaces are spherical (or flat).
2) Glass types follow the Schott optical glass catalog
3) All dimensions are in millimeters FIG. 9B and the above Table represent only one exemplary lens design. It is anticipated that experienced lens designers could arrive at other suitable designs after having studied the present disclosure.

Reverting to FIG. 6, this also shows an optional image rotation prism 36. Image rotation prisms enable arbitrary image rotation, which is useful in some of the embodiments to be described below. Its operation will be described here; a discussion of its use in systems according to the invention will be presented at a later point herein.

Prior art examples of image rotation prisms are shown in FIGS. 10A and 10B and in R. Kingslake, Optical System Design, Chapter 9, section V, pps. 163 (Academic Press, New York, 1983) and other publications cited there. Generally, prisms that use an odd (1, 3, 5, . . . ) number of reflections, and in which an incoming beam that is on the axis of rotation of the prism will exit on the same axis, can be used as image rotation prisms. FIGS. 10A and 10B are examples of such prisms, in which all active surfaces are planar and are perpendicular to the surface of the drawing sheet. FIGS. 10D, 10E, and 10G show how the inputted image of FIG. 10C is changed when the prism is rotated. Since the prism has an odd number of reflecting surfaces, an incoming image must be reversed at the output. The axis of reversal rotates with the prism, so that the output image rotates twice as fast as the prism.

An embodiment based on the principles that were discussed above is shown in FIG. 11. This embodiment has an additional scanner 70, shown as a scanning mirror, which is located at or close to the pupil plane of the relay optics sub-unit 39. Beam splitter 31, laser 22 with its beam shaping optics 35, as well as detector assembly 32 and its optional collecting lens 33 are all located at the other side of the new scanning mirror 70. Light emitted from laser 22 passes through beam shaping optics 35 and is deflected by scanner 70 into relay optics sub-unit 39. It is likely that this embodiment would not need an image rotation prism, but if it does, the prism will be located inside the 'box' marked as 39(+36) in FIG. 11. From there light is deflected again by main scanners 26+27 and passes through large lens 37 and then though a selected one of the lenslets in array 30, where it is focused on the data surface of disk 24. For readout, reflected light goes back through the same lenslet of the array 30, then the lens 37, scanners 26+27, relay optics sub-unit 39(+36), which may contain image rotation prism 36, and scanner 70, after which the beam is deflected by beam splitter 31 toward optional lens 33 and detector assembly 32.

Figure 11:
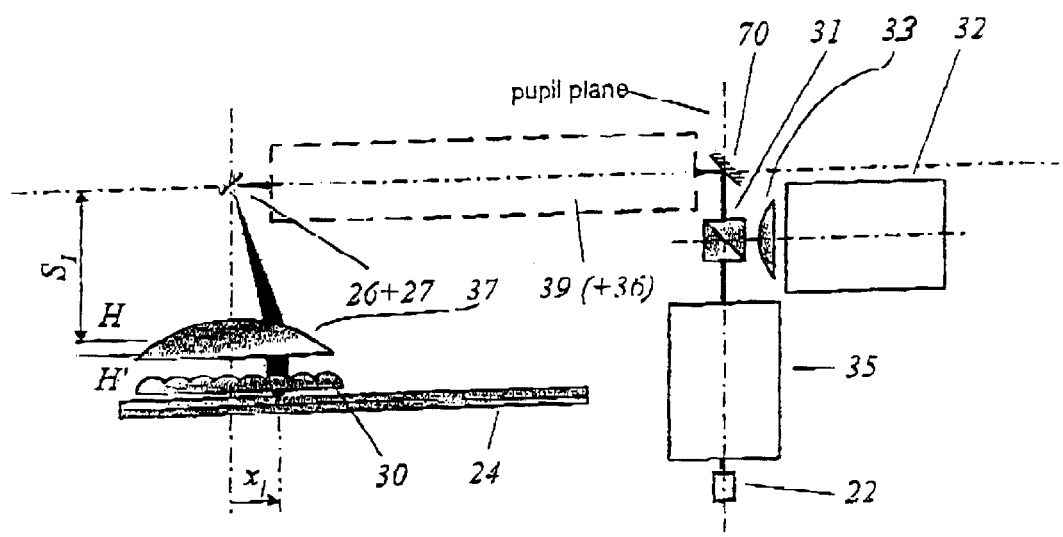
FIG. 11 is a schematic cross section of a third embodiment of the invention, which is based in part on the embodiment of FIGS. 6 through 9.

It can be seen from FIG. 11 and the discussion above that when scanner 70 is centered so that the central, or axial, ray of the incoming beam travels along the optical axis of relay optics sub-unit 39, the beam is focused on the center of the mirror of scanners 26+27, which center is, in turn, at the focal point of lens 37. Now, lens 37 will collimate this beam such that the collimated beam is parallel to its optical axis. Since the optical axis of each of the lenslets in array 30 is parallel to the optical axis of lens 37, the selected lenslet, i.e., the one that will receive the light beam, will focus the beam to a point on the recording surface of disk 24 that is located precisely under the optical center of this lenslet. The important point is that as long as the light reaches the same lenslet, a change in the deflection angles of scanners 26+27 will not materially affect the location of the spot on the recording surface of disk 24.

The operation of scanners 26+27 and 70 is further exemplified in FIGS. 12A, 12B and 12C. FIG. 12A is identical with FIG. 11. For the given position of scanners 26+27 and centered scanner 70 in FIG. 12A, the light beam is focused at a point at some distance $x_1$ from the axis of lens 37, precisely under the center of the selected lenslet. In FIG. 12B, scanner 70 is still centered, but scanners 26+27 are moved so that a different lenslet is illuminated. The location of the focused spot now to be under the optical center of this new lenslet. FIG. 12C shows the same system, but now scanners 26+27 are in the same position as in FIG. 12A, but scanner 70 has been moved. The location of the spot on the disk recording surface, $x_1-\Delta x$, has changed: $x_1$ is the same as in FIG. 12A, but now $\Delta x$ indicates that the spot is no longer precisely under the center of the lenslet. The value of $\Delta x$ is nearly proportional to the change in the deflection angle caused by scanner 70; this deflection angle change shifts the position of the beam at the plane of scanners 26+27 so that it no longer hits the scanning mirror on the axis of lens 37. As a result, after collimation the beam is no longer parallel to the optical axes of the lenslets in array 30.

Figure 12:
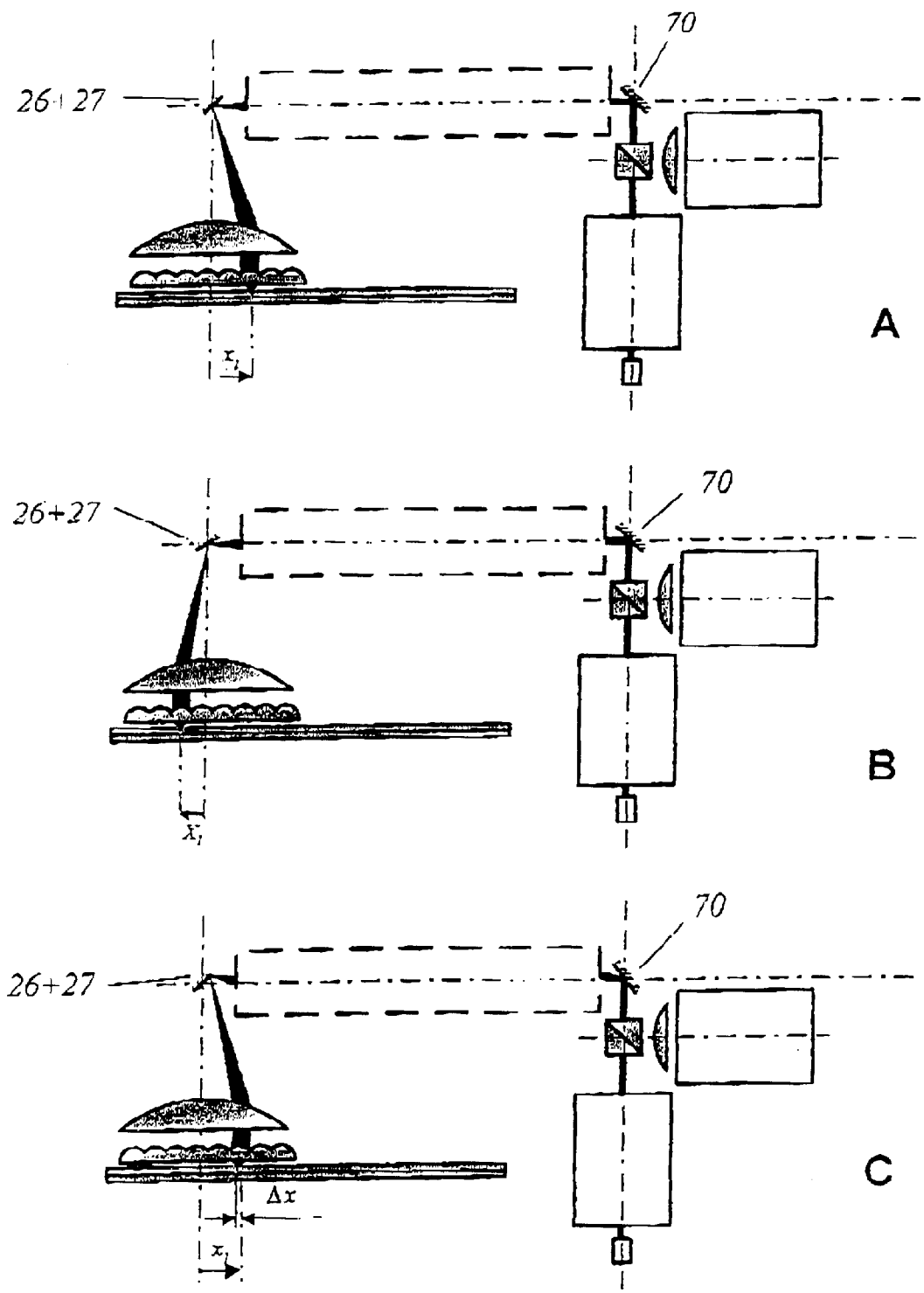
FIGS. 12A, 12B and 12C are views similar to FIG. 11, showing different operating states of the third embodiment.

The important points are that in the system of FIGS. 11 and 12:
1. The selection of the lenslet to which the beam is directed is governed only by scanners 26+27, while the position of the focused spot on the recording surface of the disk relative to the center of the selected lenslet is controlled only by scanner 70. Thus the precision required from each of the scanners, in terms of total scan angle divided by accuracy of deflection angle, is relatively low, resulting in much lowered costs.
2. Each lenslet may receive light in the same range of angles, centered on its optical axis, so that all lenslets can be precise replicas of each other.

Both are in contrast with the prior-art system disclosed in the above-cited Glaser patent, where the same scanners 6 and 7 control both lenslet selection and spot position relative to the center of the selected lenslet. This leads to a need for very high precision scanners.

Figure 1:
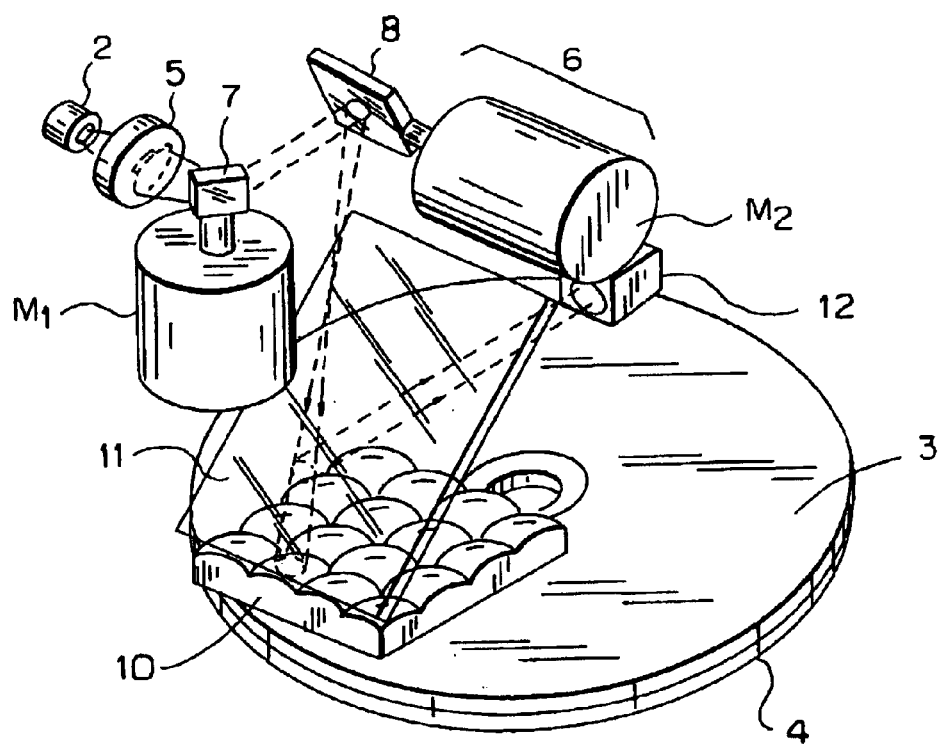
FIG. 1 shows one type of prior art scanning arrangement.

Typically, a prior art system based on FIG. 1 will require at least one scanner with an angular range to angular precision ratio higher than about 1:10,000, whereas a system incorporating the principles depicted in FIGS. 11 and 12 only needs scanners with an angular range to angular precision ratio significantly lower than 1:1000. Low precision scanners do not usually need complex feedback control sensors and electronics, and may be realized with very fast MEMS, acoustic-optics, or electro-optics modules, further enhancing the performance of the system. The use of identical lenslets in the lenslet arrays of systems based on FIGS. 11 and 12 make the design, fabrication and testing of these lenslet arrays vastly easier and less expensive.

Figure 13:
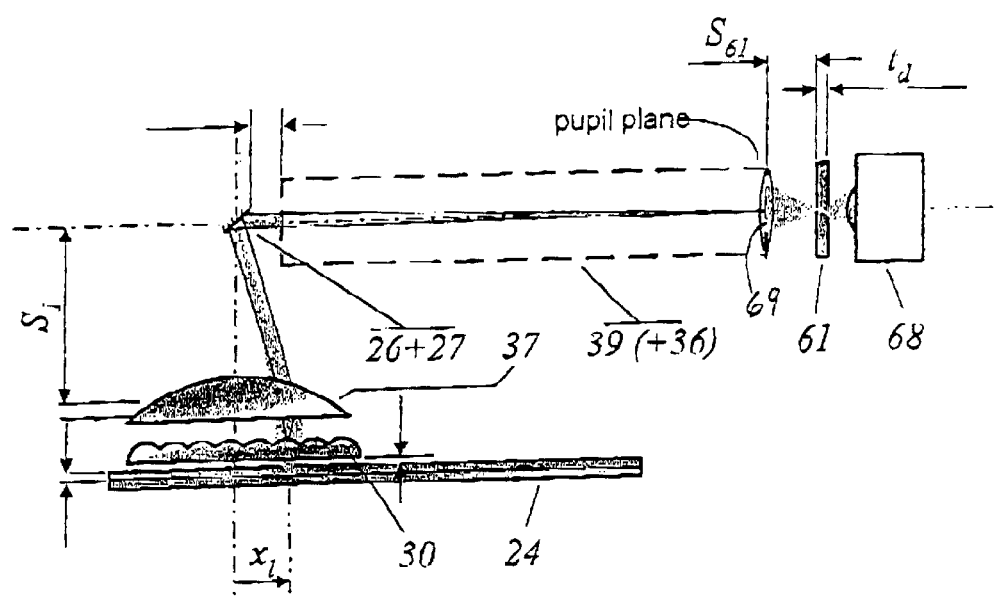
FIG. 13 is a view similar to FIG. 11, showing a variant of the third embodiment.

A derivative of this third embodiment is shown by way of example in FIG. 13. With this variant, a conventional optical disk drive head 68 or a functionally equivalent sub-unit is used. Thus, subsequent references herein to head 68 will be understood to be a reference to that head or to such a functionally equivalent sub-unit. Unlike conventional optical disk drives, however, this head is static and need not be located in proximity to the disk surface. Head 68 contains all or most of the standard components of conventional optical disk drive heads, including one or more lasers, one or more beam splitters, collimating and/or beam shaping optics, a focusing lens mounted on two axis actuator, allowing controlled movement along, and perpendicularly to, its optical axis, detectors and their associated optics and possibly some electronics, etc. The lens of head 68, like those in conventional heads, has actuators, such as solenoids, that enable the lens to move both along the optical axis and in one direction across the optical axis. Light from the laser contained in head 68 is focused by the lens on an intermediate plane, near or at an optionally transparent plate 61 having two parallel planar surfaces, and is then picked up by the optical relay system 39' (+36). Plate 61 may be needed in order to remove optical aberrations from the light focused by the lens of unit 68, since many disk heads contain lenses designed to work through the thickness of a cover layer on the disk. The thickness and refractive index of plate 61 may be the same or close to those of the optical disk layer between the data and external surfaces. In FIG. 13 sub-unit 39' is almost identical to sub-unit 39 of FIGS. 6 through 12 and has an additional lens 69 located at, or very close to, the pupil plane at a distance $S_{61}$ from plate 61. That lens has a focal length of about $S_{61}$, so that this lens approximately collimates the light that was focused by the lens of head 68. The rest of the optical path of the light follows closely that shown and described for FIGS. 6 through 9, 11 through 12.

The beam from head 68 is shown with a gray fill. It arrives at lens 69 as a diverging beam, and is collimated (or nearly collimated) by lens 69. This light then continues through the rest of sub-unit 39', followed by scanners 26+27, lens 37 and a selected lenslet of array 30 where it is focused at or near the recording surface of disk 24. It can be seen that the entire sub-system composed of optional plate 61, relay optics sub-unit 39', large lens 37 and the selected lenslet from array 30 images the point of light created by head 68 onto or near the recording surface of disk 24. Sub-unit 39' together with lens 37, has its exit pupil at the selected lenslet, so light that went through the center of the pupil of unit 39' will intercept the lenslet at its center. Now, in the event of focus errors, conventional optical head control circuitry disposed in or associated with head 68 will send a correcting signal to the actuator for the lens in head 68 to move that lens axially, as indicated by the detectors, optics, and focus correction circuitry of head 68, so that the beam that emerges from lens 69 in unit 39' is no longer strictly collimated, and thus the beam would not arrive at the selected lenslet as a collimated beam, causing the beam that exits from the lenslet towards the disk to converge to a spot at a distance slightly different from the focal length of the lenslet. This enables correction of focus errors due to warped or incorrectly mounted disks. As the lens of unit 68 is moved sideways, it is no longer on the same axis as lens 69, resulting in a sideways inclination of the center of the beam emerging from lens 69 towards the rest of unit 39'. This has the same effect as moving scanner 70 in FIGS. 11 and 12

Though lens 69 is drawn as an additional component, its function can be implemented by changing the design of unit 39' such that it is intended to receive a diverging beam of suitable properties (as generated by the lens of assembly 68) instead of a collimated (or nearly collimated) beam.

Compared with the embodiment of FIGS. 11 and 12, that of FIG. 13 can make use of available mass produced conventional heads and their associated circuitry. Since such heads and electronic circuits are already produced in very large numbers, economy of scale may lead to reduced costs.

Relay optics sub-unit 39' of FIG. 13 differs from relay optics sub-unit 39 of FIGS. 11 and 12. In FIGS. 11 and 12 the light at the side of the detector and the laser enters the sub-unit as collimated or nearly collimated; in contrast, in the system of FIG. 13 light from the head enters the sub-unit as diverging from a focused point. This requires a different design of sub-system 39' for systems based on FIG. 13. The change can be implemented by adding a suitable collimating lens 69 to sub-unit 39 (of FIGS. 11 and 12) as shown in FIG. 13, or, alternatively, a different overall design of the entire sub-unit.

Light reflected from the disk surface returns through the same lenslet from array 30, lens 37, scanners 26+27 and sub-unit 39' (+36) and is focused at or near plate 61. The light is then picked up by the lens of head 68. If the system is at perfect focus, the image of the spot originally created by the lens of head 68 from the laser output would be located precisely on the recording surface of disk 24 and when reflected will be reimaged to the exact three dimensional location of the outgoing spot created by head 68 at or near optional plate 61. The head would 'see' exactly the same response it would if it were indeed located next to the disk in a conventional drive. If, however, there is a focus error, the reflection of the spot created by the lenslet of array 30 would be displaced longitudinally along the axis of the lenslet.

If the focus at the disk is too low (lower than the disk surface as shown in the figure), the returned reflection would be too high (disk is higher than expected focus) and the image of the reflected spot will be shifted "back" along the folded path so it would move towards right near plate 61 in the figure. As the light is picked up by the head this would be detected by the focus error detectors. The focus and tracking error detection optics and detectors are located inside unit 68, as they are in conventional optical disk heads. The electronic parts for these functions may be located either inside, or outside, unit 68, or may be split into internal and external circuits. The system has focus detection and control electronic circuitry (not shown) similar to those used with the same optical disk head in a conventional drive, and this circuitry will generate an electronic signal that, fed to the proper solenoid in the head, would move the lens of the head to effect focus correction. Now, if there is a lateral (normal to its optical axis) translation of the lens of the head 68, the light will still go through the same lenslet, but the location of the spot on the disk data surface 24 will move, facilitating fine selection of the desired track on the disk and tracking error correction. Thus, the configuration of FIG. 13 allows the use of a conventional, potentially unmodified, optical disk head, which need not be physically moved across the disk. One advantage of this configuration is that it allows use of currently mass-produced conventional disk heads and most of their associated electronics, reducing significantly non-recurrent expenses and exploiting cost advantages of existing very large volume production.

All of the embodiments described so far address seek time reduction exclusively. For some applications there are also appreciable benefits from increasing the transfer rate.

In the embodiments discussed here below, parallel, multi-track simultaneous access is provided together with reduced seek time, thus obtaining 'the best of both worlds'. Furthermore, there will be described here how parallel multi-track access can be used for writing and/or erasing multiple tracks simultaneously, while each track receives different data.

Figure 14:
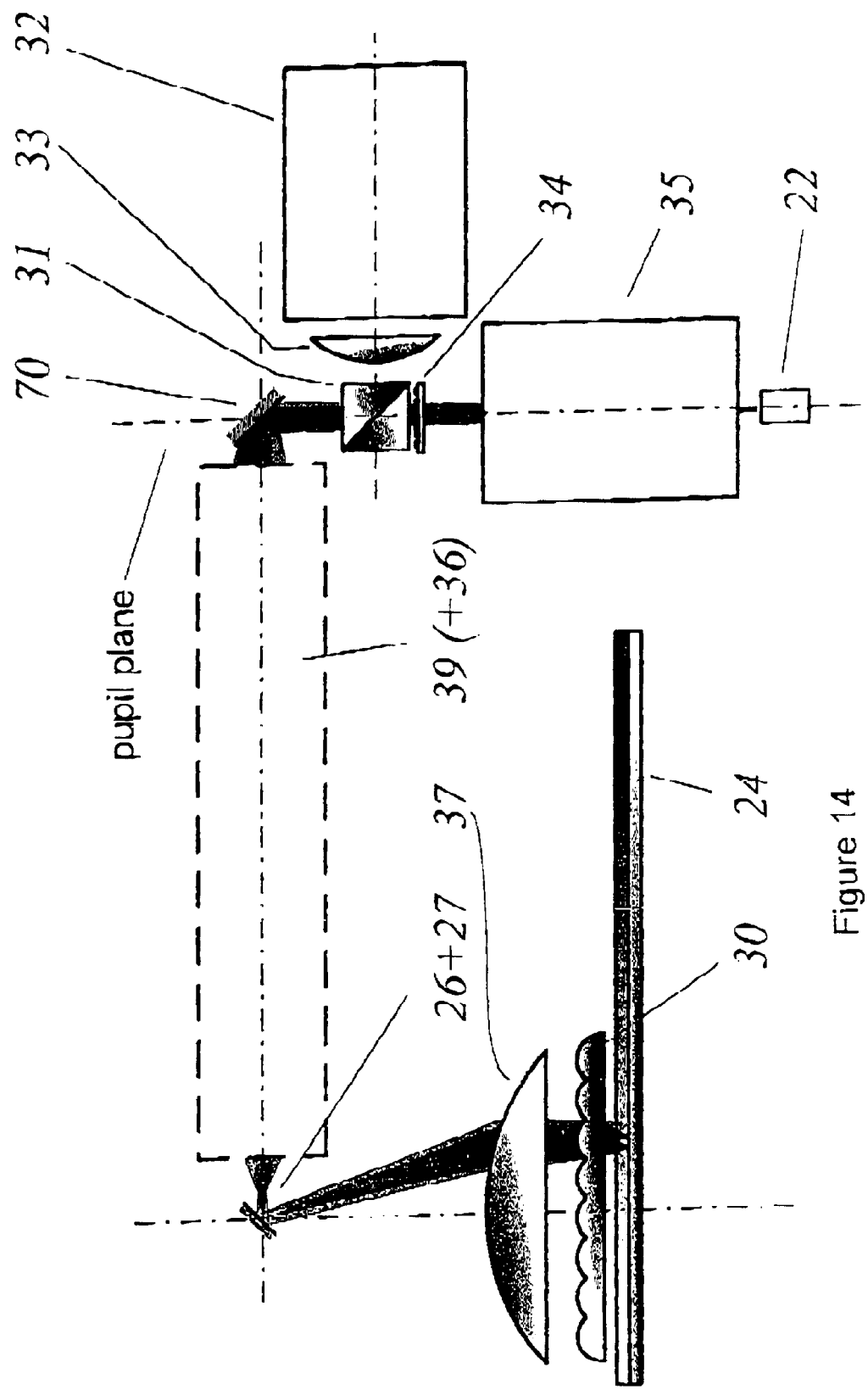
FIG. 14 is a pictorial top plan view of a fourth embodiment of the invention, which is another modification of the embodiment of FIGS. 6 through 9.
Figure 15:
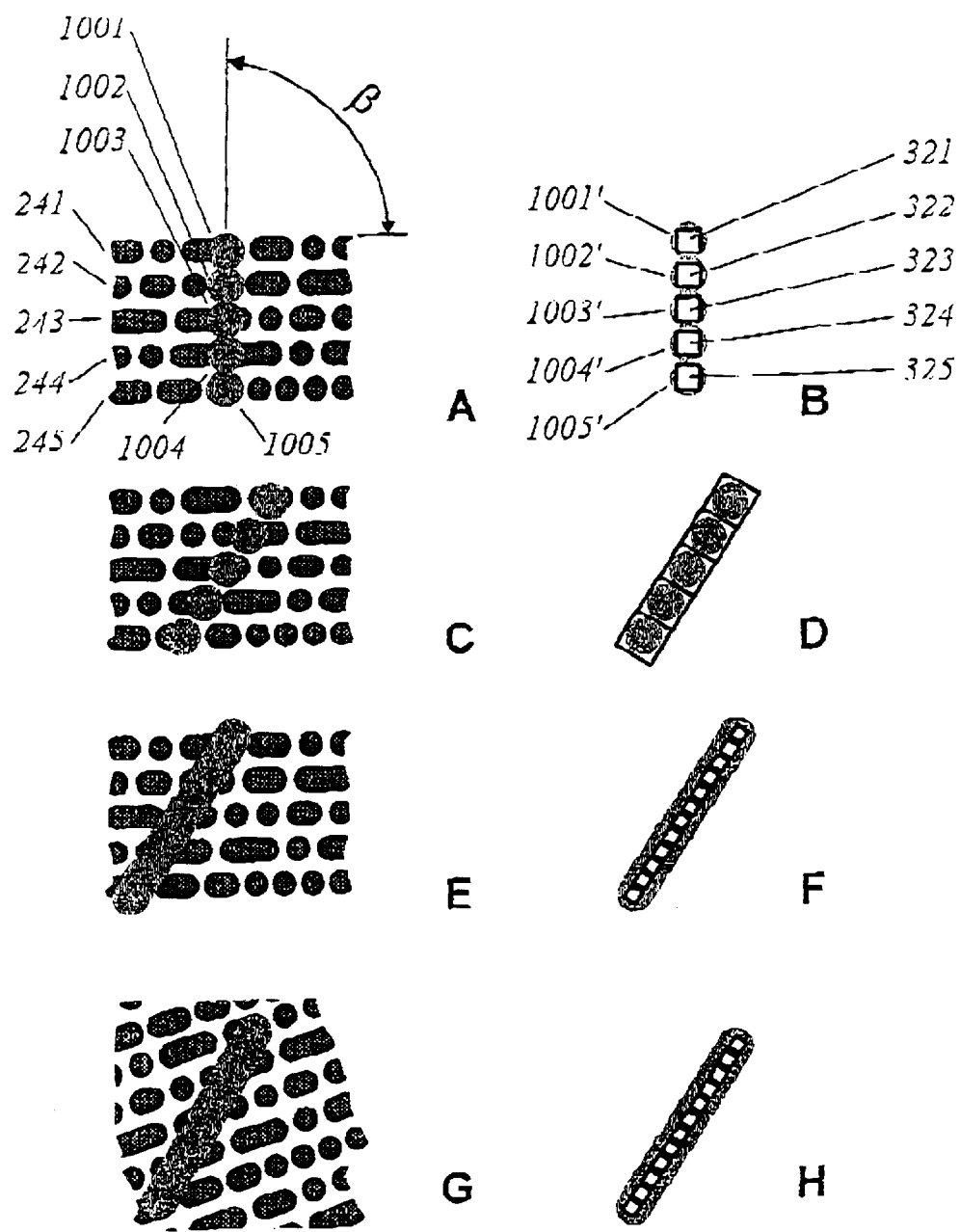
FIGS. 15A, 15C, 15E and 15G show disk surface portions and illumination patterns associated with different detector arrays.
FIGS. 15B, 15D, 15F and 15H show associated detector array orientations.

FIG. 14 shows an embodiment that provides, in addition to the fast seek advantage of the other embodiments described here, also high raw transfer rate. Optical disk drives based on this embodiment are useful in applications where there is a need to read (or optionally to write) large sequential files fast, or to further enhance the overall drive performance.

In FIG. 14, several features are intentionally drawn not to scale, to facilitate depiction of relatively small details. Also, several of the possible laser beams are shown in FIG. 14.

As in the system of FIGS. 11 and 12, light comes from a laser 22 through a beam-shaping unit 35. Here, however, there is an array generating optical element 34. In FIG. 14, element 34 is shown as a special diffraction grating. However, other types of array generating elements have been discussed in detail in the literature. Array generating elements take a single laser beam and divide it into several beams, usually with nearly equal intensity. These beams are typically spaced by a constant (or nearly constant) angle. Array generation by diffraction gratings was described in H. Damman and K Gbrtler, "High efficiency, in-line, multiple imaging by means of multiple phase holograms," Optics Communications 3, 312–315 (1971), as well as in U. Krackhardt and N. Streibl, "Design of Damman grating for array generation," Optics Communications 74, 31–36 (1989), in D. Daly, S. M. Hodson and M. C. Hutley, "Fan-out gratings with continuous profile," Optics Communications 82, 183–187 (1991) and many others scientific and technical papers. These contain detailed recipies [SP?] on how to design and fabricate such gratings. Other types of array generators have also been described in the literature, including those based on use of lenslet arrays described, for example, in N. Streibl, U. Nolscher, J. Jahns and S. Walker, "Array generation with lenslet arrays," Applied Optics 30, 2739–2742 (1991). Yet another option is the use of the Talbot optical effect, described in F. Talbot, "Facts relating to optical science, No. IV," Philos. Mag. 9, 401–407 (1836). Any of these approaches, and other methods as described elsewhere and as may be discovered, may be used here.

In FIG. 14, the incoming beam is split into three parts (in an actual embodiment, the number of beams is likely to be larger. FIG. 14 shows only three beams for the sake of clarity). These beams (depicted in FIG. 14 in shades of gray for clarity, though in an actual system they all would have about the same intensity) enter beam splitter 31, scanner 70, and so on, until they all arrive at the same lenslet at array 30 (due to the design of the relay sub-unit 39, as described earlier). Because each of the beams has a slightly different angle, they are focused at slightly different locations on the data surface of the disk 24. Thus there are three spots of light on the data surface of the disk. The lenslet now images the reflected light, with the help of the large lens 37, sub-unit 39, etc., on three detectors inside detector assembly 32. In practice, any number of beams, from two to over one hundred, may be used. The exact number is selected by considerations such as the total amount of available laser power, optical design considerations, considerations related to the data structure and format on the disk, etc. For each beam there is a detector in the detector assembly unit 32, so that the unit actually has an array of detectors. As each beam and associated detector reads another track on the disk, the data transfer rate can be multiplied by the number of beams/detectors. An optional image rotation prism 36 can be used to align the beams with specific tracks, as explained later.

Additional variations on this embodiment include
1. The use of a multiple track (parallel access) conventional head [as described, for example, in A. Alon, S. Shapira and I. Katz, "Method for accounting the track data from multiple track image and optical disk," U.S. Pat. No. 5,426,623 (Jun. 20, 1998)], and a configuration similar to the one of FIG. 11.
2. The use of a laser array, or multiple lasers, to generate several independent beams. This allows for independent modulation of each of the multiple beams. It is also possible to use separate modulators, such as electro-optical or acousto-optical modulators, with a single (possibly more powerful) laser and array generator optics, in order to modulate each beam separately, to the configuration of this FIG. 14, or to the configuration of variation 1, above. In either case, individually modulated beams with sufficient power (enabled because the lasers are located in a static part of the system, so weight or power dissipation do not materially affect the drive) allow parallel, multi-track, writing on suitable writable optical disks, resulting with high transfer rate also for writing.

FIGS. 15A–15H show several possible configurations of laser beam spots on the recording surface of the disk, and the associated patterns at the detector array. Specifically, FIG. 15B shows the detector array and the image of the laser spot pattern on the disk recording surface as depicted in FIG. 15A; FIG. 15D shows the detector array and the image of the laser spots pattern on the disk recording surface as depicted in FIG. 15C; FIG. 15F shows the detector array and the image of the laser spots pattern on the recording surface as depicted in FIG. 15E; and FIG. 15H shows the detector array and the image of the laser spots pattern on the recording surface as depicted in FIG. 15G.

FIG. 15A shows tracks of data 241, 242, 243, 244 and 245, each composed of written 'spots' that can be pits, as in mass replicated read-only CD-s or DVD disks, areas of different pigment as in some write-once disks, areas of different crystalline phase as in CD-RW, DVD-RAM, DVD-RW, DVD+RW, and other disks, areas of different magnetization, (in Magneto-Optical disks), etc. These tracks are illuminated by focused spots of laser light 1001, 1002, 1003, 1004 and 1005, respectively. The focused light is reflected by the disk, goes through the optical system as described above, and arrives at the detector assembly. The spots on the disk recording surface are imaged on the detector array as shown in the example of FIG. 15B. Here, spots 1001', 1002', 1003', 1004' and 1005', are images of spots 1001, 1002, 1003, 1004 and 1005, respectively. Each of these spots is imaged onto one detector, 321, 322, 323, 324 or 325 of the array. Thus, as the disk rotates and the tracks move across the laser spots, each detector reads the data through the reflected light from one track. Here, the number of spots and tracks shown was selected for purely illustrative purposes: in practice any number from two to a few hundred spots can be selected. The actual number is a function of many design parameters such as the total laser power available, quality of optical components, etc., which are in turn governed by engineering and cost/performance considerations.

Comparing FIG. 15A with FIG. 15C, in FIG. 15C the space between the focused laser spots is larger, resulting from choice of different design parameters in the optical system, but as the angle β in FIG. 15C is smaller than in FIG. 15A, it is still possible to match laser spots with tracks without changing the track spacing. The condition for such a match is $$P_{spots} \cos \beta = P_{tracks} \quad (6)$$

where $P_{spots}$ is the spacing (pitch) between the centers of the focused laser spots on the disk recording surface, and $P_{tracks}$ is the track center-to-center spacing.

Now, since the lenslets of the lenslet array are distributed over a two dimensional area, and since the tracks on the disk are circular, or spiral, and not straight lines, and because the geometry of the scanning subsystem must support two dimensional scanning, normally, for different lenslets the angle β would come out different and, normally, track spacing to laser spot spacing would not match for all lenslets.

This may be compensated for by one of the following:
1. Changing $P_{spots}$ possibly by adding some zooming element into relay optical system 39 of FIG. 14. Moving this zoom system quickly as we switch from one lenslet to another may be difficult, so this is less likely to be the preferred solution. However, a variant of this method may use changeable or movable array generation elements that can vary the angular spacing between the beams (for example, an array generation grating will change the angle between the multiple beams it generates if tilted slightly).
2. Using an image rotation prism, as described above, to maintain the angle β. A pre-calculated table in the firmware of the controller electronics can contain the proper orientation for the image rotation prism for each lenslet. As the scanners switch the beams from one lenslet to another, the prism rotates to the proper position to maintain β relative to the local direction of the tracks.
3. Use oversampling. This will be explained in the following paragraphs.

FIGS. 15E through 15H present an example of the oversampling option. Here, the spot spacing is rather small, so spots practically overlap to create a nearly continuous line of illumination at the disk surface. Thus, while, in this example, the beams cover only five tracks, at least ten beams are used. This line of light is imaged onto a detector array that has at least twice as many detectors as the number of tracks covered by the laser light. The signals from the tracks can be extracted by selecting the detectors that happen to be nearly centered above the images of each track, or it can be calculated by combining incoming data from adjacent detectors and minimizing cross talk through proper calculation. For example, for the k-th detector, the signal can be estimated using a formula of the form $$s_{k,out}(t) = \ldots + c_2 s_{k-2}(t) + c_1 s_{k-1}(t) + c_0 s_k + c_1 s_{k-1}(t) + c_2 s_{k+2}(t) + \quad (7)$$

where $\ldots, s_{k-2}(t), s_{k-1}(t), s_k, s_{k+1}(t), s_{k+2}(t) \ldots$ are the raw signals from detectors at locations $\ldots, k-2, k-1, k, k+1, k+2, \ldots$ respectively, and $c_0, c_1, c_2 \ldots$ are suitable convolution coefficients, of which some may be negative. By analyzing the resulting signals $s_{k,out}(t)$ for each k it is possible to detect the signals that are related to specific tracks. The other resulting signals $s_{k,out}(t)$ are discarded. Since there are many more detectors than illuminated tracks, one $s_{k,out}(t)$ should remain for each illuminated track. A table contained in the control firmware can store the values of the $c_k$-s to be used with each lenslet.

When proceeding from one lenslet to another, e.g., when moving from FIG. 15E to FIG. 15G, the angle β varies so different $s_{k,out}(t)$'s must be selected. However, there is no need for an image rotation prism. A valuable spin off of this scheme is that as the location of the tracks relative to the detectors moves, due to minor mechanical eccentricity, vibrations, etc., the system can dynamically select other $s_{k,out}(t)$-s to effect auto-tracking electronically. With the one-beam-per-track scheme discussed earlier, some tracking correction mechanism, such as the use of a third scanner similar to 70 in FIG. 11, must be used.

Figure 16:
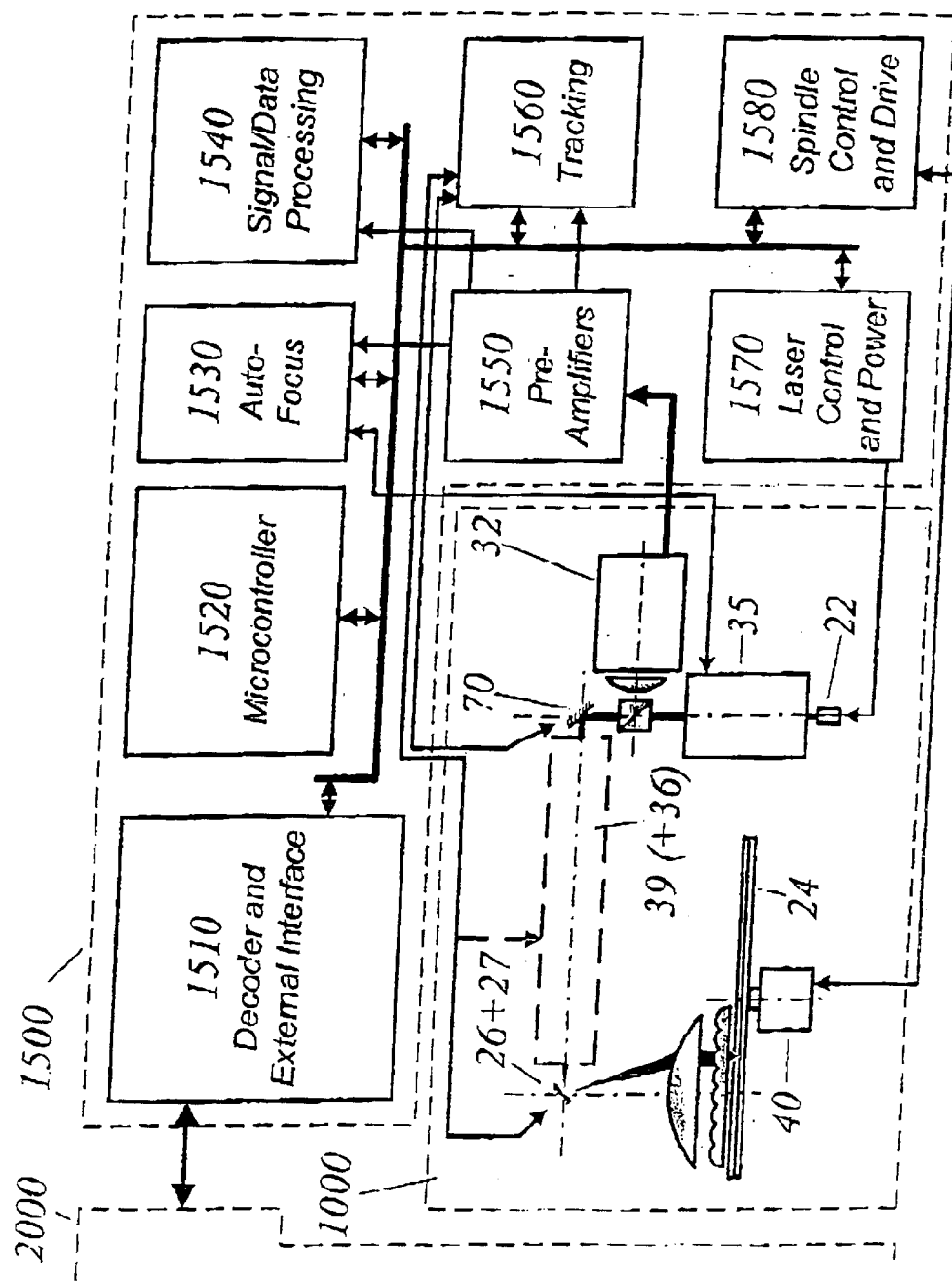
FIG. 16 is a schematic diagram of a complete optical disk drive incorporating any one of the embodiments of the invention.

The entire optical disk drive, as schematically shown in FIG. 16, is composed of an optical-mechanical assembly 1000, and electronics unit or units, collectively shown as 1500. The disk drive is usually interfaced to some "client" system 2000, which may be a computer, a disk library unit, a control panel with a television interface electronics and connector unit, etc, or possibly a control unit and an audio system. In this figure, the opto-mechanical system of FIG. 11 is shown for assembly 1000. However, similar electronic circuitry and general organization can be used with any of the embodiments described here.

The operation of the system is supervised and coordinated by micro-controller unit 1520 (in practice, for example, there may be several micro-controllers that control different aspects of the operation, with a master micro controller to coordinate their operation). Detector assembly 32 provides signals from several detectors to pre-amplifiers 1550 (which may actually be located inside the casing of the detector assembly). The pre-amplifiers send suitable amplified signals to the signal/data processing unit 1540, to the auto focus control unit 1530 and to the tracking control unit 1560. Auto-focus unit 1530 processes the signals it receives, and sends an appropriate current to the focus actuator, located inside the beam-shaping unit 35. This results in changing beam divergence/convergence and moving the spot generated by the lenslet on the array. This feedback operation results in maintaining focus at the disk surface. When the focus error is sufficiently small, unit 1530 sends a suitable "OK" signal to controller 1520. In a similar manner, track control unit 1560 maintains the beam on the track using signals from the detectors and scanner 70, and notifies the controller 1520 as needed. It can also use the track error signal for other functions, such as detecting groove wobble on writable disks for synchronizing the data rate with the disk rotation speed. The interface unit 1510 reads commands sent from the client system 2000, and decodes them for the controller 1520, which may command tracking unit 1560 to move scanners 26, 27 and possibly 70, to the position needed in order to access the desired track. This may be done by using table look up in the memory of controller 1520. Once the proper track is intercepted, and adequate focus and tracking are achieved (as indicated by the signal received by 1520 from 1530 and 1560), the controller commands the signal processing unit 1540 to commence reading the data from the signal it receives from the detectors, and convert it into data which can be sent out through the interface unit 1510. During this operation the laser control unit reads the optical power from laser 22, and adjusts its current to maintain stable output. Spindle control unit 1580, which is interfaced with the spindle motor 40, as well as with the controller 1520 and possibly the signal-processing unit 1540 maintains the proper rotational speed of the disk.

Control circuitry for other embodiments of the invention such as those described with reference FIGS. 13, 14, 17 and 18, will need appropriate modifications to support the different and/or added features of these embodiments, but can follow rather closely the same logic as depicted and described here.

The electronic circuit outlined in this FIG. 16 is by no means the only one that will enable implementation of any or all forms of this invention, and is being described here as one example.

The procedure for writing is quite similar, except that now the laser control system 1570 receives processed signals from the signal processing unit 1540, and a suitable command from the controller 1520. Data received from the interface unit 1510 from the client system is sent to the signal processing unit, which provides the laser controller 1570 with processed signals, as needed to modulate laser 22.

The embodiments described so far address only the seek time, i.e., the time it takes to reach the desired track on the disk, and the raw transfer rate of the optical disk drive. Another important performance factor is the latency, which is described in S. W. Ng, "Advances in disk technology: performance issues," Computer 31(5), 75–81 (May 1998). Latency is defined as the average time needed by the disk to rotate to the proper position; for conventional drives it is half the time it takes the disk to make one rotation. The total access time is thus composed, with possible overlap, of both seek time and latency. The conventional way of decreasing latency is to spin the disk faster. There is a practical limit to the rotational speed of the disk, resulting, for example, from mechanical stability issues at high RPMs, particularly with removable media. The solution for minimizing latency according to the present invention is schematically depicted in FIG. 17. This embodiment has the same overall configuration as that of FIG. 6. However, instead of a single lenslet array (30 in FIG. 6) there are several lenslet arrays 50a and 50b. Also, the large lens 37 of FIG. 6 is replaced with an even larger lens 57 covering all lenslet arrays. Each of the several lenslet arrays can access all tracks on the disk. The lenslet arrays are distributed as far from each other as possible. For example, if there are two lenslet arrays, they should be 180° apart, and if there are five arrays, they should be positioned 72° apart. Other numbers of lenslet arrays can be provided. For engineering reasons, all or several of the lenslet arrays (50a, 50b . . . in FIG. 17) may be physically combined into a single large array, and/or the lens 57 in FIG. 17 may be split into several parts or replaced by several lenses, provided that each covers the relevant area of a lenslet array completely, and that all parts or lenses are made and positioned so that they share the same focal point. Placing the focal point at the center of rotation is not absolutely necessary, but quite possibly the best option. It is of course also possible to duplicate the entire "train" of sub-units 26,27,22, 36,39 31,32,33,35, but that may be more expensive. Yet another option is to duplicate only scanners 26+27, and add some beam addressing mechanism to select which of the scanner pairs we work with at any moment.

Each track can be accessed through at least one lenslet in each of the lenslet arrays. Control firmware or circuitry selects the lenslet that is expected to be the first one to cover the required sector, accounting for the disk rotation and the time needed to get light to that lenslet. Thus, the decrease in the latency is directly proportional to the number of lenslet arrays. If there are n lenslet arrays, the latency $l_{n,mSec}$ (in milliseconds) would be $$l_{n,mSec} = 60,000/(2n\, \omega_{RPM}) \tag{8}$$

where $\omega_{RPM}$ is the rotational speed of the disk in revolutions per minute. For example, if n=3 (three lenslet arrays), and $\omega_{RPM}$=10,000, the resulting latency is 1 mSec. If there were only one lenslet array, a rotational speed of 30,000 RPM would be required to achieve the same latency.

Latency enhancement techniques according to the invention can be incorporated into any of the embodiments shown in FIGS. 1 and 3–16, combining all of the benefits discussed there with latency enhancement.

Multiple lenslet arrays can be used to solve other problems. For example, drives supporting several types of media, often require several laser wavelengths and optical lens characteristics. Presently, DVD drives need different lens characteristics (numerical aperture, media thickness, wavelength) for accessing DVD and CD formats. It is possible to use an array, or arrays, for one media type, and another array, or arrays, for the other.

One conceptual problem in all optical disk drive systems based on the principles described in this section and in the Glaser patent, cited earlier, is the limited number of tracks that can be read through a single lenslet. This may result in the need to 'jump' to another lenslet in the middle of a read operation, and to wait until the disk rotates to the position just before that jump took place. Many optical disk formats, CD and DVD families included, use spiral rather than circular tracks. When reading a file that spans several disk turns, a point may be reached where the next radial position needed is outside the range covered by the particular lenslet. The only way to read the rest of the file is by "jumping" to another lenslet. However, since the jump takes time (seek time), it is very likely that the particular point on the disk where the read operation was discontinued may be missed. In that case, it is necessary to wait for almost a complete disk rotation time before reading can continue. To minimize this, embodiments of this invention may have overlap tracks. The overlapped tracks concept can beneficially be used with all embodiments of this invention, as well as with the invention disclosed in the Glaser patent, cited above. Thus, if, for example, the total number of tracks in a disk of some given type is 50,000, and each single lenslet can reach 625 tracks, a minimum of 50000/625=80 lenslets are needed. Instead, a larger number of lenslets is provided, such that some tracks can be read from several lenslets. For example, these 625 tracks can be divided as follows:

| Track function | No. of tracks |
| --- | --- |
| overhead covering disk eccentricity on the first track | 70 |
| tracks that can be read only through one lenslet | 335 |
| tracks that can be read also through another lenslet | 150 |
| overhead covering disk eccentricity on the last track | 70 |
| Total tracks per lenslet | 625 |

This requires 150 lenslets, rather than 80, but assure that any data stream with 150 or fewer consecutive tracks can be read through one lenslet with no jumps, and that disk eccentricity would not cause data loss.

The actual track overlap strategy, i.e., the number of overlapped tracks as well as whether this number is the same for all lenslets or varies between lenslets, can be changed to adapt to the particular statistics of the data on the disk media, and the accepted rate of mid-stream jumps. For example, if these statistics show that 99% of the files on disks containing certain types of data are shorter than 58 tracks, and if 1% is considered a reasonable mid-stream jump rate, 58 tracks can be selected to be read also through another lenslet and the number of tracks that can be read only through one lenslet can be increased to 427, so that only 118 lenslets are needed. As hinted above, in practice a different number of overlapped tracks can be associated with different lenslets, because most disk media formats put less data in each of the inner tracks than in the outer tracks.

It is noted that the values given for numbers of tracks in the examples above are illustrative, and the numbers used in actual designs may differ significantly from those cited. The numbers that would be used in actual products are derived from parameters such as, but not limited to, track pitch for the particular disk media and format, optical parameters and design for the lenslets, and other optical sub-units, etc.

FIG. 18 shows a further embodiment that is more economical than those described previously herein; it combines split-head methodology with novel features of this invention. A further advantage of the embodiment of FIG. 18 is that it can be easily "folded" optically with one or few mirrors, to obtain very low profile, as desirable for applications such as "notebook" and "palm-top" portable computers.

The system shown in FIG. 18 is, in part, similar to that of FIG. 6. Parts and sub-units 22, 24, 27, 31, 32, 33, 35 and 39 are identical in shape and function to their counterparts of FIG. 6. In the system of FIG. 18, however, there is only one scanning mirror assembly 27, scanning mirror assembly 26 being omitted, and some of the other parts are either changed or omitted, as will be described below.

Specifically, as light comes out of sub-unit 39 it is redirected by an optional stationary mirror 46 toward the mirror of single axis scanning assembly 27, that sends it through a lens 47 toward a single lens 40. Mirror 46 may be omitted if, for example, it is possible to components 22, 35, 31 and 39 to have an optical axis directed toward the mirror of scanning assembly 27, perpendicular to the pivot axis of that mirror. Lens 47, which performs the same function as lens 37 of FIG. 6, may be cut into a long rectangular form, since only part of the circular lens area is actually used. A small lens 40 corresponds in function to one lenslet and is mounted on a railing 41 for movement along a radius of disk 24. Lens 40 may be mounted on a small carriage (not shown). Lens 40 and its optional carriage, can be displaced by a motor, or actuator (not shown), to move lens 40 in the radial direction along railing 41. This actuator can be in the form of a linear motor, mounted along the railing and in the carriage that carries lens 40, or may be a conventional motor with a drive mechanism such as a lead-screw, rack and pinion, belt, or other circular-to-linear motion conversion mechanism. It may also include a position sensor, such as an encoder or a potentiometer, supplying information to the electronic circuitry regarding the position of lens 40. Known electronic control circuitry, which may be in the form of a firmware controlled microcontroller, a dedicated electronic microcircuit, analog circuitry, or a part thereof, etc., synchronizes the position of lens 40 with the orientation of the mirror of scanning assembly 27. Alternatively, this motion may be synchronized mechanically, possibly by use of cam based mechanism. The center of the mirror of scanning assembly 27 is at, or very near, the focal point of lens 47, so that the position $y_{40}$ of the optical axis of lens 40 along its direction of travel is related to the rotation angle of the scanner $\Phi_{27}$ by:

$$y_{40} = F_{47} \tan 2\Phi_{27} \qquad (9)$$

where $F_{47}$ is the focal length of lens 47 and $\phi_{27}=0$ is defined as the angular position of scanner 27 that corresponds to $y_{40}=0$.

The embodiment of FIG. 18 acts, thus, as a split moving head system. Like the systems disclosed in the above-cited Glaser patent, and systems disclosed herein, it has a stationary part that contains most of the hardware, including the laser, detector assembly, miscellaneous optical components, etc. The moving part contains only the focusing lens. In particular, focus and fine tracking can be controlled by the stationary part, as disclosed in the above-cited Glaser patent, and other embodiments of the current invention, so no focus and tracking actuators need to be placed in the carriage with the moving lens. Thus, the moving part can be far lighter, and hence more agile, than the moving parts in conventional split-head designs such as that disclosed in J. Ichihara, K. Tezuki and K. Ogawa, "Development of actuators for small-size magneto-optical disk drives," Jap. J. Applied Physics 31 (Part 1, No 2B), 519{523 (1992).

Refinements of the embodiments described above with reference to FIGS. 14–15 and 17 can be combined also with this configuration. For example, to decrease latency, railing 41 can be constructed to extend across the entire diameter of disk 24, and two (or even more) moving lenses served by a single stationary optical system can be mounted on railing 41.

Figure 19:
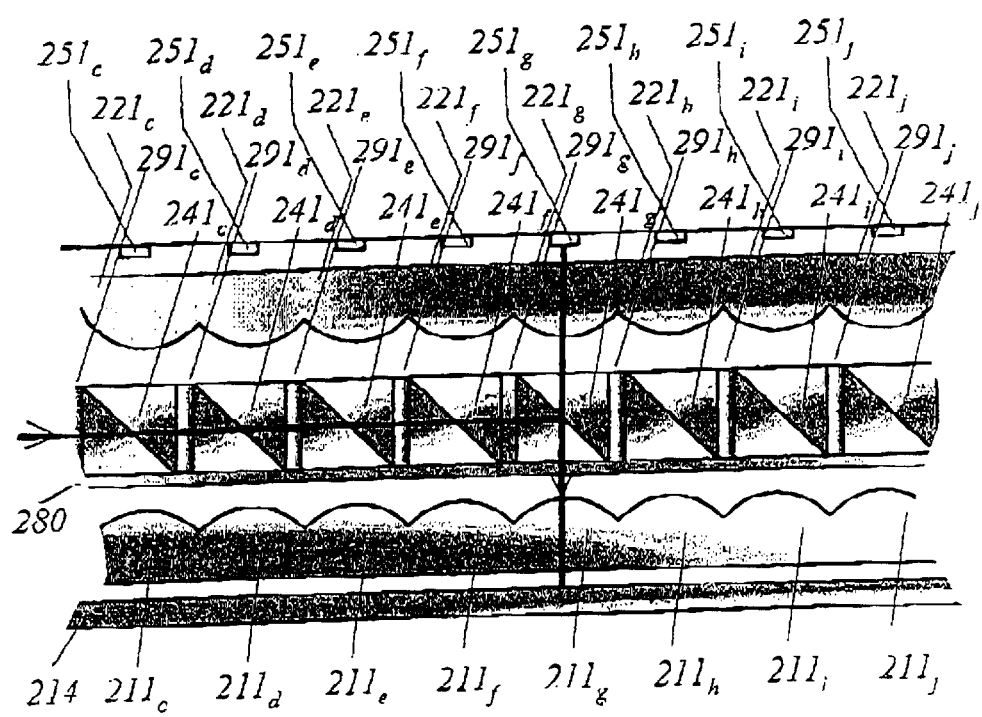
FIG. 19 is a cross-sectional, elevational, detail view of a seventh embodiment of the invention.

FIG. 19 shows a further embodiment of the invention that eliminates certain shortcomings of the apparatus disclosed in the Damen et al. patent cited earlier herein. FIG. 19 is a cross-sectional view taken along a plane that is roughly equivalent to the plane of FIG. 2B. The illustrated embodiment includes a first array of lenslets $211_c$, $211_d$, $211_e$, $211_f$, $211_g$, $211_h$, $211_i$ and $211_j$ for focusing a laser light beam 270 on disk 214. A second array of lenslets $221_c$, $221_d$, $221_e$, $221_f$, $221_g$, $221_h$, $221_i$ and $221_j$ is arranged to focus light reflected from disk 214 onto respective ones of an array of light detectors $251_c$, $251_d$, $251_e$, $251_f$, $251_g$, $251_h$, $251_i$ and $251_j$. Laser beam 280 is polarized and comes from a beam source and scanning assembly(s) (not shown) that may be identical to those shown in FIG. 2A and disclosed in the Damen et al patent. Beam 270 is directed along a line that passes through a plurality of beam splitters $241_c$, $241_d$, $241_e$, $241_f$, $241_g$, $241_h$, $241_i$ and $241_j$ that are interposed between lenslets 211 and lenslets 221. In front of each beam splitter there is a respective electrically actuatable light modulator $291_c$, $291_d$, $291_e$, $291_f$, $291_g$, $291_h$, $291_i$ and $291_j$. Each of these light modulators 291 acts as a switchable $\lambda/2$ retardation plate with optical axes at 45° to the plane of the drawing. When a modulator 291 is in the 'off' condition, it does not affect the intensity or the polarization of the light that goes through it. When a modulator 291 switched 'on', a light beam that enters it with a polarization either parallel or perpendicular to the plane of the drawing will exit with its polarization switched by 90°.

In practice, there are many ways to construct such modulators. For example, a relatively inexpensive modulator that is suitable is an FLC-type liquid crystal modulator that is designed to modulate polarization as described above. By way of example, the beam splitters may be designed to transmit substantially all light with polarization perpendicular to the plane of the drawing and to reflect substantially all light with polarization parallel to the plane of the drawing, and the incoming beam 270 may be polarized perpendicular to the drawing plane.

In the operating state depicted in FIG. 19, modulators $291_c$, $291_d$, $291_e$ and $291_f$ are all in the 'off' state, while modulator $291_g$ is 'on'. Light beam 280 will go through modulators $291_c$ through $291_f$ and polarizing beam splitters $241_c$ through $241f$ with very little loss. Since modulator $291_g$ switches the polarization of beam 270, almost all of the light in beam 270 will be deflected by polarizing beam splitter $241_g$ toward lenslet $211_g$ that will focus it on the recording surface of the disk 214. Since substantially all of the light is deflected by beam splitter $241_g$, little or no light at all reaches lenslets other than $211_g$.

For readout, light returns through lenslet $211_g$, which acts like a cats-eye retro-reflector. Now, depending on the polarization properties of the recording surface, it may be necessary to provide a wave retardation plate 280. For example, if the material has no intrinsic polarization properties, plate 280 can be a $\lambda/4$ retardation plate with optical axes at 45° to the plane of the drawing. Light coming through plate 280 on the way from the beam splitter $291_g$ toward the disk surface would become circularly polarized. On reflection from the disk surface the sense of the circular polarization will change, so when the light goes back through the $\lambda/4$ retardation plate, it will become linearly polarized perpendicularly to the plane of the drawing, so it would not be deflected by the beam splitter $241_g$ this time. Therefore, the light will reach lenslet $221_g$, which will focus it on light detector $251_g$. Retardation plate 280 can be a switchable modulator, so the amount of its retardation can be selected to fit the particular type of recording layer in the optical disk, and the same optical disk drive can be used with several types of recording media.

In operation, in addition to the control circuitry described in the Damen et al patent cited above, circuitry will be provided to switch the correct light modulator or modulators $291_x$ (x being c, d, e, . . . as needed), to select the particular lenslet $241_x$ (x being c, d, e, . . . as needed), to effect the desired disk access.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. Apparatus for scanning an optical disk that is mounted for rotation with a surface of the disk disposed in a scanning plane, the disk surface having light reflecting areas, said apparatus comprising:
   a light source for producing a narrow beam of light;
   a scanning assembly for directing the beam toward the scanning plane and deflecting the beam parallel to the scanning plane;
   a focusing lens unit disposed in the path of the beam to focus the beam at the scanning plane; and
   a light beam deflecting element disposed in the beam path between said scanning assembly and said focusing lens unit to deflect the beam toward a direction perpendicular to the scanning plane.

2. The apparatus of claim 1 wherein the light reflecting areas of the disk surface are arranged in a plurality of mutually parallel tracks, said scanning assembly is operated to direct the beam toward any of the tracks, and said deflecting element is operative to deflect the beam when the beam is being directed toward any of the tracks.

3. The apparatus of claim 2 wherein said focusing lens unit comprises a group of individual focusing lens spaced apart parallel to the scanning plane and each having an optical axis that is perpendicular to the scanning plane.

4. The apparatus of claim 3 wherein said light beam deflecting element comprises a plurality of prisms each aligned with a respective individual focusing lens.

5. The apparatus of claim 4 wherein each said prism has a surface with an inclination corresponding to the distance between said prism and a line extending perpendicular to the scanning plane and passing through a point at which the beam exits said scanning assembly.

6. The apparatus of claim 3 wherein said light beam deflecting element is a single conveying lens dimensioned to deflect the beam towards any selected individual lens of said groups of individual lenses of said lens unit.

7. The apparatus of claim 6 wherein said single conveying lens is disposed at a distance from a point at which the beam exits said scanning assembly, and said conveying lens has a focal length substantially equal to said distance.

8. The apparatus of claim 7 where said conveying lens has an optical axis that is perpendicular to the scanning plane and that passes through the point at which the beam exits said scanning assembly.

9. The apparatus of claim 3 wherein said individual lenses are dimensioned and arranged so that at least two of said individual lenses can direct the beam toward a selected track.

10. The apparatus of claim 3 wherein said individual lenses are dimensioned and arranged so that for any consecutive group of tracks that contain less than a pre-defined number of tracks, or a pre-defined amount of data, there is at least one lenslet that can access this entire group.

11. The apparatus of claim 1 wherein said light source comprises an image rotation device for rotating the beam about its axis.

12. The apparatus of claim 1 further comprising a second scanning assembly positionable for varying the beam direction to cause the beam to be directed to said light beam deflecting element in a direction such that said beam deflecting element deflects the beam along a path that forms an acute angle with the direction perpendicular to the scanning plane.

13. The apparatus of claim 1 wherein said light source comprises:
   an optical disk drive head mounted in fixed position and producing a light beam that is focused at an output plane associated with said head; and
   a relay optics sub-unit interposed between said head and said scanning assembly, wherein said relay optics unit operates in combination with said focusing lens unit and said light beam deflecting element to image the light that is focused at said output plane onto the scanning plane.

14. The apparatus of claim 1 wherein the light reflecting areas of the disk surface are arranged in a plurality of tracks; said light source produces a plurality of beams that diverge from one another; and said focusing unit and light beam deflecting element direct each beam to a respective one of said tracks.

15. The apparatus of claim 14 wherein the beams are spaced apart such that, as they are focused on the disk data surface, there would be at least twice as many focused spot as the number of tracks they cover.

16. The apparatus of claim 14 wherein said light source comprises a plurality of lasers each producing a respective one of the beams.

17. The apparatus of claim 16 wherein said light sources further comprises means for modulating each beam.

18. The apparatus of claim 14 wherein said light sources further comprises means for modulating each beam.

19. The apparatus of claim 1 wherein: said focusing lens unit comprises a plurality of groups of individual focusing lenses; said individual lenses in each said group are spaced apart parallel to the scanning plane; each of said individual lenses has an optical axis that is perpendicular to the scanning plane; and each said group is associated with a different region of the scanning plane.

20. The apparatus of claim 1 wherein said focusing lens unit is mounted for movement parallel to the scanning plane.

21. Apparatus for scanning an optical disk that is mounted for rotation with a surface of the disk disposed in a scanning plane, the disk surface having light reflecting areas arranged in a plurality of mutually essentially parallel tracks, or a long spiral with essentially constant pitch, said apparatus comprising:
   a light source for providing a narrow beam of light and directing the beam along a path that is substantially parallel to the scanning plane;
   a focusing unit comprising a group of individual focusing lenses spaced apart in a direction parallel to the scanning plane and transverse to the tracks, each individual focusing lens having an optical axis that is perpendicular to the scanning plane; and
   light directing means disposed in line with the path at a location for directing light from said light source substantially entirely to a respective one of said individual lenses, wherein said light directing means comprise:
- a plurality of reflecting elements each disposed to reflect light traveling along the path from said light source to a second path perpendicular to one of said individual focusing lenses; and
- a plurality of light modulators, each disposed between said light source and a respective one of said reflecting elements.

22. The apparatus of claim 21 wherein the beam from said light source is polarized in a first direction, each of said light modulators is switchable between a first state for maintaining the beam polarized in the first direction and a second state for rotating the polarization of the beam to a second direction, and each of said reflecting elements is operative to reflect light having one of the first and second polarization directions and to pass light having the other one of the first and second polarization directions.

23. The apparatus of claim 1 wherein said light beam deflecting element has two mutually opposed surfaces, and the beam path between said scanning assembly and said focusing lens unit traverses both of said surfaces.

* * * * *